(12) United States Patent
Tschanz

(10) Patent No.: US 11,180,024 B2
(45) Date of Patent: *Nov. 23, 2021

(54) SYSTEM AND APPROACH FOR DYNAMIC VEHICLE SPEED OPTIMIZATION

(71) Applicant: Garrett Transportation I Inc., Torrance, CA (US)

(72) Inventor: Frederic Tschanz, Vancouver (CA)

(73) Assignee: Garrett Transportation I Inc., Torrance, CA (US)

( * ) Notice: Subject to any disclaimer, the term of this patent is extended or adjusted under 35 U.S.C. 154(b) by 167 days.

This patent is subject to a terminal disclaimer.

(21) Appl. No.: 16/364,945

(22) Filed: Mar. 26, 2019

(65) Prior Publication Data
US 2019/0217704 A1    Jul. 18, 2019

Related U.S. Application Data

(62) Division of application No. 15/211,889, filed on Jul. 15, 2016, now Pat. No. 10,272,779.

(Continued)

(51) Int. Cl.
*B60K 31/00* (2006.01)
*B60W 50/00* (2006.01)
(Continued)

(52) U.S. Cl.
CPC .......... *B60K 31/0008* (2013.01); *B60W 10/04* (2013.01); *B60W 20/11* (2016.01);
(Continued)

(58) Field of Classification Search
CPC ............. B60K 31/0008; G05D 1/0005; G05D 1/0088; B60W 50/0097; B60W 30/143;
(Continued)

(56) References Cited

U.S. PATENT DOCUMENTS 3,744,461 A    7/1973  Davis
4,005,578 A    2/1977  McInerney
(Continued)

FOREIGN PATENT DOCUMENTS

CN    102063561 A    5/2011
CN    102331350 A    1/2012
(Continued)

OTHER PUBLICATIONS

Delphi, Delphi Diesel NOx Trap (DNT), 3 pages, Feb. 2004.
(Continued)

*Primary Examiner* — Yuen Wong
(74) *Attorney, Agent, or Firm* — Seager, Tufte & Wickhem LLP

(57) ABSTRACT

A system and approach for a vehicle system. The vehicle system may include a vehicle, a propulsion device (e.g., a combustion engine or electric motor), and a controller. The propulsion device may at least partially power the vehicle. The controller may be in communication with the propulsion device and may control the propulsion device according to a target speed of the vehicle. The controller may include a model of energy balances of the vehicle and may use the model to estimate energy losses over a travel horizon of the vehicle. The controller may optimize a cost function over the travel horizon of the vehicle based at least in part on the estimated energy losses to set an actual speed for the vehicle. The estimated energy losses may include one or more of aerodynamic drag, vehicle friction, and conversion efficiency from the propulsion device.

14 Claims, 6 Drawing Sheets

Related U.S. Application Data

(60) Provisional application No. 62/201,388, filed on Aug. 5, 2015.

(51) Int. Cl.
  *B60W 30/14* (2006.01)
  *B60W 20/11* (2016.01)
  *B60W 10/04* (2006.01)
  *G05D 1/00* (2006.01)

(52) U.S. Cl.
  CPC ...... *B60W 30/143* (2013.01); *B60W 50/0097* (2013.01); *G05D 1/0005* (2013.01); *G05D 1/0088* (2013.01); *B60W 2050/0028* (2013.01); *B60W 2530/16* (2013.01); *B60W 2552/15* (2020.02); *B60W 2552/20* (2020.02); *B60W 2555/60* (2020.02); *B60W 2720/10* (2013.01); *Y02T 10/40* (2013.01); *Y02T 10/84* (2013.01)

(58) Field of Classification Search
  CPC .. B60W 20/11; B60W 10/04; B60W 2552/15; B60W 2552/20; B60W 2555/60; B60W 2050/0028; B60W 2530/16; B60W 2720/10; B60W 30/18; B60W 40/076; B60W 40/13; B60W 2710/08; B60W 2710/06; Y02T 10/40; Y02T 10/84
  See application file for complete search history.

(56) References Cited

U.S. PATENT DOCUMENTS

| | | |
|---|---|---|
| 4,055,158 A | 10/1977 | Marsee |
| 4,206,606 A | 6/1980 | Yamada |
| 4,252,098 A | 2/1981 | Tomczak et al. |
| 4,359,991 A | 11/1982 | Stumpp et al. |
| 4,383,441 A | 5/1983 | Willis et al. |
| 4,426,982 A | 1/1984 | Lehner et al. |
| 4,438,497 A | 3/1984 | Willis et al. |
| 4,440,140 A | 4/1984 | Kawagoe et al. |
| 4,456,883 A | 6/1984 | Bullis et al. |
| 4,485,794 A | 12/1984 | Kimberley et al. |
| 4,601,270 A | 7/1986 | Kimberley et al. |
| 4,616,308 A | 10/1986 | Morshedi et al. |
| 4,653,449 A | 3/1987 | Kamel et al. |
| 4,671,235 A | 6/1987 | Hosaka |
| 4,735,181 A | 4/1988 | Kaneko et al. |
| 4,947,334 A | 8/1990 | Massey et al. |
| 4,962,570 A | 10/1990 | Hosaka et al. |
| 5,044,337 A | 9/1991 | Williams |
| 5,076,237 A | 12/1991 | Hartman et al. |
| 5,089,236 A | 2/1992 | Clerc |
| 5,094,213 A | 3/1992 | Dudek et al. |
| 5,095,874 A | 3/1992 | Schnaibel et al. |
| 5,108,716 A | 4/1992 | Nishizawa et al. |
| 5,123,397 A | 6/1992 | Richeson |
| 5,150,289 A | 9/1992 | Badavas |
| 5,186,081 A | 2/1993 | Richardson et al. |
| 5,233,829 A | 8/1993 | Komatsu |
| 5,270,935 A | 12/1993 | Dudek et al. |
| 5,273,019 A | 12/1993 | Matthews et al. |
| 5,282,449 A | 2/1994 | Takahashi et al. |
| 5,293,553 A | 3/1994 | Dudek et al. |
| 5,349,816 A | 9/1994 | Sanbayashi et al. |
| 5,365,734 A | 11/1994 | Takeshima |
| 5,394,322 A | 2/1995 | Hansen |
| 5,394,331 A | 2/1995 | Dudek et al. |
| 5,398,502 A | 3/1995 | Watanabe |
| 5,408,406 A | 4/1995 | Mathur et al. |
| 5,431,139 A | 7/1995 | Grutter et al. |
| 5,452,576 A | 9/1995 | Hamburg et al. |
| 5,477,840 A | 12/1995 | Neumann |
| 5,560,208 A | 10/1996 | Halimi et al. |
| 5,570,574 A | 11/1996 | Yamashita et al. |
| 5,598,825 A | 2/1997 | Neumann |
| 5,609,139 A | 3/1997 | Ueda et al. |
| 5,611,198 A | 3/1997 | Lane et al. |
| 5,682,317 A | 10/1997 | Keeler et al. |
| 5,690,086 A | 11/1997 | Kawano et al. |
| 5,692,478 A | 12/1997 | Nogi et al. |
| 5,697,339 A | 12/1997 | Esposito |
| 5,704,011 A | 12/1997 | Hansen et al. |
| 5,740,033 A | 4/1998 | Wassick et al. |
| 5,746,183 A | 5/1998 | Parke et al. |
| 5,765,533 A | 6/1998 | Nakajima |
| 5,771,867 A | 6/1998 | Amstutz et al. |
| 5,785,030 A | 7/1998 | Paas |
| 5,788,004 A | 8/1998 | Friedmann et al. |
| 5,842,340 A | 12/1998 | Bush et al. |
| 5,846,157 A | 12/1998 | Reinke et al. |
| 5,893,092 A | 4/1999 | Driscoll |
| 5,917,405 A | 6/1999 | Joao |
| 5,924,280 A | 7/1999 | Tarabulski |
| 5,942,195 A | 8/1999 | Lecea et al. |
| 5,964,199 A | 10/1999 | Atago et al. |
| 5,970,075 A | 10/1999 | Wasada |
| 5,974,788 A | 11/1999 | Hepburn et al. |
| 5,995,895 A | 11/1999 | Watt et al. |
| 6,029,626 A | 2/2000 | Bruestle |
| 6,035,640 A | 3/2000 | Kolmanovsky et al. |
| 6,048,620 A | 4/2000 | Zhong et al. |
| 6,048,628 A | 4/2000 | Hilman et al. |
| 6,055,810 A | 5/2000 | Borland et al. |
| 6,056,781 A | 5/2000 | Wassick et al. |
| 6,058,700 A | 5/2000 | Yamashita et al. |
| 6,067,800 A | 5/2000 | Kolmanovsky et al. |
| 6,076,353 A | 6/2000 | Freudenberg et al. |
| 6,105,365 A | 8/2000 | Deeba et al. |
| 6,122,555 A | 9/2000 | Lu |
| 6,134,883 A | 10/2000 | Kato et al. |
| 6,153,159 A | 11/2000 | Engeler et al. |
| 6,161,528 A | 12/2000 | Akao et al. |
| 6,170,259 B1 | 1/2001 | Boegner et al. |
| 6,171,556 B1 | 1/2001 | Burk et al. |
| 6,178,743 B1 | 1/2001 | Hirota et al. |
| 6,178,749 B1 | 1/2001 | Kolmanovsky et al. |
| 6,208,914 B1 | 3/2001 | Ward et al. |
| 6,216,083 B1 | 4/2001 | Ulyanov et al. |
| 6,233,922 B1 | 5/2001 | Maloney |
| 6,236,956 B1 | 5/2001 | Mantooth et al. |
| 6,237,330 B1 | 5/2001 | Takahashi et al. |
| 6,242,873 B1 | 6/2001 | Drozdz et al. |
| 6,263,672 B1 | 7/2001 | Roby et al. |
| 6,273,060 B1 | 8/2001 | Cullen |
| 6,279,551 B1 | 8/2001 | Iwano et al. |
| 6,312,538 B1 | 11/2001 | Latypov et al. |
| 6,314,351 B1 | 11/2001 | Chutorash |
| 6,314,662 B1 | 11/2001 | Ellis, III |
| 6,314,724 B1 | 11/2001 | Kakuyama et al. |
| 6,321,538 B2 | 11/2001 | Hasler et al. |
| 6,327,361 B1 | 12/2001 | Harshavardhana et al. |
| 6,338,245 B1 | 1/2002 | Shimoda et al. |
| 6,341,487 B1 | 1/2002 | Takahashi et al. |
| 6,347,619 B1 | 2/2002 | Whiting et al. |
| 6,360,159 B1 | 3/2002 | Miller et al. |
| 6,360,541 B2 | 3/2002 | Waszkiewicz et al. |
| 6,360,732 B1 | 3/2002 | Bailey et al. |
| 6,363,715 B1 | 4/2002 | Bidner et al. |
| 6,363,907 B1 | 4/2002 | Arai et al. |
| 6,379,281 B1 | 4/2002 | Collins et al. |
| 6,389,203 B1 | 5/2002 | Jordan et al. |
| 6,425,371 B2 | 7/2002 | Majima |
| 6,427,436 B1 | 8/2002 | Allansson et al. |
| 6,431,160 B1 | 8/2002 | Sugiyama et al. |
| 6,445,963 B1 | 9/2002 | Blevins et al. |
| 6,446,430 B1 | 9/2002 | Roth et al. |
| 6,453,308 B1 | 9/2002 | Zhao et al. |
| 6,463,733 B1 | 9/2002 | Zhao et al. |
| 6,463,734 B1 | 10/2002 | Tamura et al. |
| 6,466,893 B1 | 10/2002 | Latwesen et al. |
| 6,470,682 B2 | 10/2002 | Gray, Jr. |
| 6,470,862 B2 | 10/2002 | Isobe et al. |
| 6,470,886 B1 | 10/2002 | Jestrabek-Hart |
| 6,481,139 B2 | 11/2002 | Weldle |

(56) References Cited

U.S. PATENT DOCUMENTS

| | | |
|---|---|---|
| 6,494,038 B2 | 12/2002 | Kobayashi et al. |
| 6,502,391 B1 | 1/2003 | Hirota et al. |
| 6,505,465 B2 | 1/2003 | Kanazawa et al. |
| 6,510,351 B1 | 1/2003 | Blevins et al. |
| 6,512,974 B2 | 1/2003 | Houston et al. |
| 6,513,495 B1 | 2/2003 | Franke et al. |
| 6,532,433 B2 | 3/2003 | Bharadwaj et al. |
| 6,542,076 B1 | 4/2003 | Joao |
| 6,546,329 B2 | 4/2003 | Bellinger |
| 6,549,130 B1 | 4/2003 | Joao |
| 6,550,307 B1 | 4/2003 | Zhang et al. |
| 6,553,754 B2 | 4/2003 | Meyer et al. |
| 6,560,528 B1 | 5/2003 | Gitlin et al. |
| 6,560,960 B2 | 5/2003 | Nishimura et al. |
| 6,571,191 B1 | 5/2003 | York et al. |
| 6,579,206 B2 | 6/2003 | Liu et al. |
| 6,591,605 B2 | 7/2003 | Lewis |
| 6,594,990 B2 | 7/2003 | Kuenstler et al. |
| 6,601,387 B2 | 8/2003 | Zurawski et al. |
| 6,612,293 B2 | 9/2003 | Schweinzer et al. |
| 6,615,584 B2 | 9/2003 | Ostertag |
| 6,625,978 B1 | 9/2003 | Eriksson et al. |
| 6,629,408 B1 | 10/2003 | Murakami et al. |
| 6,637,382 B1 | 10/2003 | Brehob et al. |
| 6,644,017 B2 | 11/2003 | Takahashi et al. |
| 6,647,710 B2 | 11/2003 | Nishiyama et al. |
| 6,647,971 B2 | 11/2003 | Vaughan et al. |
| 6,651,614 B2 | 11/2003 | Flamig-Vetter et al. |
| 6,662,058 B1 | 12/2003 | Sanchez |
| 6,666,198 B2 | 12/2003 | Mitsutani |
| 6,666,410 B2 | 12/2003 | Boelitz et al. |
| 6,671,596 B2 | 12/2003 | Kawashima et al. |
| 6,671,603 B2 | 12/2003 | Cari et al. |
| 6,672,052 B2 | 1/2004 | Taga et al. |
| 6,672,060 B1 | 1/2004 | Buckland et al. |
| 6,679,050 B1 | 1/2004 | Takahashi et al. |
| 6,687,597 B2 | 2/2004 | Sulatisky et al. |
| 6,688,283 B2 | 2/2004 | Jaye |
| 6,694,244 B2 | 2/2004 | Meyer et al. |
| 6,694,724 B2 | 2/2004 | Tanaka et al. |
| 6,705,084 B2 | 3/2004 | Allen et al. |
| 6,718,254 B2 | 4/2004 | Hashimoto et al. |
| 6,718,753 B2 | 4/2004 | Bromberg et al. |
| 6,725,208 B1 | 4/2004 | Hartman et al. |
| 6,736,120 B2 | 5/2004 | Surnilla |
| 6,738,682 B1 | 5/2004 | Pasadyn |
| 6,739,122 B2 | 5/2004 | Kitajima et al. |
| 6,742,330 B2 | 6/2004 | Genderen |
| 6,743,352 B2 | 6/2004 | Ando et al. |
| 6,748,936 B2 | 6/2004 | Kinomura et al. |
| 6,752,131 B2 | 6/2004 | Poola et al. |
| 6,752,135 B2 | 6/2004 | McLaughlin et al. |
| 6,757,579 B1 | 6/2004 | Pasadyn |
| 6,758,037 B2 | 7/2004 | Terada et al. |
| 6,760,631 B1 | 7/2004 | Berkowitz et al. |
| 6,760,657 B2 | 7/2004 | Katoh |
| 6,760,658 B2 | 7/2004 | Yasui et al. |
| 6,770,009 B2 | 8/2004 | Badillo et al. |
| 6,772,585 B2 | 8/2004 | Iihoshi et al. |
| 6,775,623 B2 | 8/2004 | Ali et al. |
| 6,779,344 B2 | 8/2004 | Hartman et al. |
| 6,779,512 B2 | 8/2004 | Mitsutani |
| 6,788,072 B2 | 9/2004 | Nagy et al. |
| 6,789,533 B1 | 9/2004 | Hashimoto et al. |
| 6,792,927 B2 | 9/2004 | Kobayashi |
| 6,804,618 B2 | 10/2004 | Junk |
| 6,814,062 B2 | 11/2004 | Esteghlal et al. |
| 6,817,171 B2 | 11/2004 | Zhu |
| 6,823,667 B2 | 11/2004 | Braun et al. |
| 6,826,903 B2 | 12/2004 | Yahata et al. |
| 6,827,060 B2 | 12/2004 | Huh |
| 6,827,061 B2 | 12/2004 | Nytomt et al. |
| 6,827,070 B2 | 12/2004 | Fehl et al. |
| 6,834,497 B2 | 12/2004 | Miyoshi et al. |
| 6,837,042 B2 | 1/2005 | Colignon et al. |
| 6,839,637 B2 | 1/2005 | Moteki et al. |
| 6,849,030 B2 | 2/2005 | Yamamoto et al. |
| 6,857,264 B2 | 2/2005 | Ament |
| 6,873,675 B2 | 3/2005 | Kurady et al. |
| 6,874,467 B2 | 4/2005 | Hunt et al. |
| 6,879,906 B2 | 4/2005 | Makki et al. |
| 6,882,929 B2 | 4/2005 | Liang et al. |
| 6,904,751 B2 | 6/2005 | Makki et al. |
| 6,911,414 B2 | 6/2005 | Kimura et al. |
| 6,915,779 B2 | 7/2005 | Sriprakash |
| 6,920,865 B2 | 7/2005 | Lyon |
| 6,923,902 B2 | 8/2005 | Ando et al. |
| 6,925,372 B2 | 8/2005 | Yasui |
| 6,925,796 B2 | 8/2005 | Nieuwstadt et al. |
| 6,928,362 B2 | 8/2005 | Meaney |
| 6,928,817 B2 | 8/2005 | Ahmad |
| 6,931,840 B2 | 8/2005 | Strayer et al. |
| 6,934,931 B2 | 8/2005 | Plumer et al. |
| 6,941,744 B2 | 9/2005 | Tanaka |
| 6,945,033 B2 | 9/2005 | Sealy et al. |
| 6,948,310 B2 | 9/2005 | Roberts, Jr. et al. |
| 6,953,024 B2 | 10/2005 | Linna et al. |
| 6,965,826 B2 | 11/2005 | Andres et al. |
| 6,968,677 B2 | 11/2005 | Tamura |
| 6,971,258 B2 | 12/2005 | Rhodes et al. |
| 6,973,382 B2 | 12/2005 | Rodriguez et al. |
| 6,978,744 B2 | 12/2005 | Yuasa et al. |
| 6,988,017 B2 | 1/2006 | Pasadyn et al. |
| 6,990,401 B2 | 1/2006 | Neiss et al. |
| 6,996,975 B2 | 2/2006 | Radhamohan et al. |
| 7,000,379 B2 | 2/2006 | Makki et al. |
| 7,013,637 B2 | 3/2006 | Yoshida |
| 7,016,779 B2 | 3/2006 | Bowyer |
| 7,028,464 B2 | 4/2006 | Rosel et al. |
| 7,039,475 B2 | 5/2006 | Sayyarrodsari et al. |
| 7,047,938 B2 | 5/2006 | Flynn et al. |
| 7,050,863 B2 | 5/2006 | Mehta et al. |
| 7,052,434 B2 | 5/2006 | Makino et al. |
| 7,055,311 B2 | 6/2006 | Beutel et al. |
| 7,059,112 B2 | 6/2006 | Bidner et al. |
| 7,063,080 B2 | 6/2006 | Kita et al. |
| 7,067,319 B2 | 6/2006 | Wills et al. |
| 7,069,903 B2 | 7/2006 | Surnilla et al. |
| 7,082,753 B2 | 8/2006 | Dalla Betta et al. |
| 7,085,615 B2 | 8/2006 | Persson et al. |
| 7,106,866 B2 | 9/2006 | Astorino et al. |
| 7,107,978 B2 | 9/2006 | Itoyama |
| 7,111,450 B2 | 9/2006 | Surnilla |
| 7,111,455 B2 | 9/2006 | Okugawa et al. |
| 7,113,835 B2 | 9/2006 | Boyen et al. |
| 7,117,046 B2 | 10/2006 | Boyden et al. |
| 7,124,013 B2 | 10/2006 | Yasui |
| 7,149,590 B2 | 12/2006 | Martin et al. |
| 7,151,976 B2 | 12/2006 | Lin |
| 7,152,023 B2 | 12/2006 | Das |
| 7,155,334 B1 | 12/2006 | Stewart et al. |
| 7,164,800 B2 | 1/2007 | Sun |
| 7,165,393 B2 | 1/2007 | Betta et al. |
| 7,165,399 B2 | 1/2007 | Stewart |
| 7,168,239 B2 | 1/2007 | Ingram et al. |
| 7,182,075 B2 | 2/2007 | Shahed et al. |
| 7,184,845 B2 | 2/2007 | Sayyarrodsari et al. |
| 7,184,992 B1 | 2/2007 | Polyak et al. |
| 7,188,637 B2 | 3/2007 | Dreyer et al. |
| 7,194,987 B2 | 3/2007 | Mogi |
| 7,197,485 B2 | 3/2007 | Fuller |
| 7,200,988 B2 | 4/2007 | Yamashita |
| 7,204,079 B2 | 4/2007 | Audoin |
| 7,212,908 B2 | 5/2007 | Li et al. |
| 7,275,374 B2 | 10/2007 | Stewart et al. |
| 7,275,415 B2 | 10/2007 | Rhodes et al. |
| 7,277,010 B2 | 10/2007 | Joao |
| 7,281,368 B2 | 10/2007 | Miyake et al. |
| 7,292,926 B2 | 11/2007 | Schmidt et al. |
| 7,302,937 B2 | 12/2007 | Ma et al. |
| 7,321,834 B2 | 1/2008 | Chu et al. |
| 7,323,036 B2 | 1/2008 | Boyden et al. |
| 7,328,577 B2 | 2/2008 | Stewart et al. |
| 7,337,022 B2 | 2/2008 | Wojsznis et al. |

(56) References Cited

U.S. PATENT DOCUMENTS

| | | |
|---|---|---|
| 7,349,776 B2 | 3/2008 | Spillane et al. |
| 7,383,118 B2 | 3/2008 | Imai et al. |
| 7,357,125 B2 | 4/2008 | Kolavennu |
| 7,375,374 B2 | 5/2008 | Chen et al. |
| 7,376,471 B2 | 5/2008 | Das et al. |
| 7,380,547 B1 | 6/2008 | Ruiz |
| 7,389,773 B2 | 6/2008 | Stewart et al. |
| 7,392,129 B2 | 6/2008 | Hill et al. |
| 7,397,363 B2 | 7/2008 | Joao |
| 7,398,082 B2 | 7/2008 | Schwinke et al. |
| 7,398,149 B2 | 7/2008 | Ueno et al. |
| 7,400,933 B2 | 7/2008 | Rawlings et al. |
| 7,400,967 B2 | 7/2008 | Ueno et al. |
| 7,413,583 B2 | 8/2008 | Langer et al. |
| 7,415,389 B2 | 8/2008 | Stewart et al. |
| 7,418,372 B2 | 8/2008 | Nishira et al. |
| 7,430,854 B2 | 10/2008 | Yasui et al. |
| 7,433,743 B2 | 10/2008 | Pistikopoulos et al. |
| 7,444,191 B2 | 10/2008 | Caldwell et al. |
| 7,444,193 B2 | 10/2008 | Cutler |
| 7,447,554 B2 | 11/2008 | Cutler |
| 7,467,614 B2 | 12/2008 | Stewart et al. |
| 7,469,177 B2 | 12/2008 | Samad et al. |
| 7,474,953 B2 | 1/2009 | Hulser et al. |
| 7,493,236 B1 | 2/2009 | Mock et al. |
| 7,505,879 B2 | 3/2009 | Tomoyasu et al. |
| 7,505,882 B2 | 3/2009 | Jenny et al. |
| 7,515,975 B2 | 4/2009 | Stewart |
| 7,522,963 B2 | 4/2009 | Boyden et al. |
| 7,536,232 B2 | 5/2009 | Boyden et al. |
| 7,577,483 B2 | 8/2009 | Fan et al. |
| 7,587,253 B2 | 9/2009 | Rawlings et al. |
| 7,591,135 B2 | 9/2009 | Stewart |
| 7,599,749 B2 | 10/2009 | Sayyarrodsari et al. |
| 7,599,750 B2 | 10/2009 | Piche |
| 7,603,185 B2 | 10/2009 | Stewart et al. |
| 7,603,226 B2 | 10/2009 | Henein |
| 7,627,843 B2 | 12/2009 | Dozorets et al. |
| 7,630,868 B2 | 12/2009 | Turner et al. |
| 7,634,323 B2 | 12/2009 | Vermillion et al. |
| 7,634,417 B2 | 12/2009 | Boyden et al. |
| 7,650,780 B2 | 1/2010 | Hall |
| 7,668,704 B2 | 2/2010 | Perchanok et al. |
| 7,676,318 B2 | 3/2010 | Allain |
| 7,698,004 B2 | 4/2010 | Boyden et al. |
| 7,702,519 B2 | 4/2010 | Boyden et al. |
| 7,712,139 B2 | 5/2010 | Westendorf et al. |
| 7,721,030 B2 | 5/2010 | Fuehrer et al. |
| 7,725,199 B2 | 5/2010 | Brackney et al. |
| 7,734,291 B2 | 6/2010 | Mazzara, Jr. |
| 7,738,975 B2 | 6/2010 | Denison et al. |
| 7,743,606 B2 | 6/2010 | Havelena et al. |
| 7,748,217 B2 | 7/2010 | Muller |
| 7,752,840 B2 | 7/2010 | Stewart |
| 7,765,792 B2 | 8/2010 | Rhodes et al. |
| 7,779,680 B2 | 8/2010 | Sasaki et al. |
| 7,793,489 B2 | 9/2010 | Wang et al. |
| 7,798,938 B2 | 9/2010 | Matsubara et al. |
| 7,808,371 B2 | 10/2010 | Blanchet et al. |
| 7,813,884 B2 | 10/2010 | Chu et al. |
| 7,826,909 B2 | 11/2010 | Attarwala |
| 7,831,318 B2 | 11/2010 | Bartee et al. |
| 7,840,287 B2 | 11/2010 | Wojsznis et al. |
| 7,844,351 B2 | 11/2010 | Piche |
| 7,844,352 B2 | 11/2010 | Vouzis et al. |
| 7,846,299 B2 | 12/2010 | Backstrom et al. |
| 7,850,104 B2 | 12/2010 | Havlena et al. |
| 7,856,966 B2 | 12/2010 | Saitoh |
| 7,860,586 B2 | 12/2010 | Boyden et al. |
| 7,861,518 B2 | 1/2011 | Federle |
| 7,862,771 B2 | 1/2011 | Boyden et al. |
| 7,877,239 B2 | 1/2011 | Grichnik et al. |
| 7,878,178 B2 | 2/2011 | Stewart et al. |
| 7,891,669 B2 | 2/2011 | Araujo et al. |
| 7,904,280 B2 | 3/2011 | Wood |
| 7,905,103 B2 | 3/2011 | Larsen et al. |
| 7,907,769 B2 | 3/2011 | Sammak et al. |
| 7,925,399 B2 | 4/2011 | Comeau |
| 7,930,044 B2 | 4/2011 | Attarwala |
| 7,933,849 B2 | 4/2011 | Bartee et al. |
| 7,958,730 B2 | 6/2011 | Stewart et al. |
| 7,970,482 B2 | 6/2011 | Srinivasan et al. |
| 7,987,145 B2 | 7/2011 | Baramov |
| 7,996,140 B2 | 8/2011 | Stewart et al. |
| 8,001,767 B2 | 8/2011 | Kakuya et al. |
| 8,019,911 B2 | 9/2011 | Dressler et al. |
| 8,025,167 B2 | 9/2011 | Schneider et al. |
| 8,032,235 B2 | 10/2011 | Sayyar-Rodsar |
| 8,046,089 B2 | 10/2011 | Renfro et al. |
| 8,046,090 B2 | 10/2011 | MacArthur et al. |
| 8,060,290 B2 | 11/2011 | Stewart et al. |
| 8,078,291 B2 | 12/2011 | Pekar et al. |
| 8,108,790 B2 | 1/2012 | Morrison, Jr. et al. |
| 8,109,255 B2 | 2/2012 | Stewart et al. |
| 8,121,818 B2 | 2/2012 | Gorinevsky |
| 8,145,329 B2 | 3/2012 | Pekar et al. |
| 8,146,850 B2 | 4/2012 | Havlena et al. |
| 8,157,035 B2 | 4/2012 | Whitney et al. |
| 8,185,217 B2 | 5/2012 | Thiele |
| 8,197,753 B2 | 6/2012 | Boyden et al. |
| 8,200,346 B2 | 6/2012 | Thiele |
| 8,209,963 B2 | 7/2012 | Kesse et al. |
| 8,229,163 B2 | 7/2012 | Coleman et al. |
| 8,245,501 B2 | 8/2012 | He et al. |
| 8,246,508 B2 | 8/2012 | Matsubara et al. |
| 8,265,854 B2 | 9/2012 | Stewart et al. |
| 8,281,572 B2 | 10/2012 | Chi et al. |
| 8,295,951 B2 | 10/2012 | Crisalle et al. |
| 8,311,653 B2 | 11/2012 | Zhan et al. |
| 8,312,860 B2 | 11/2012 | Yun et al. |
| 8,316,235 B2 | 11/2012 | Boehl et al. |
| 8,360,040 B2 | 1/2013 | Stewart et al. |
| 8,370,052 B2 | 2/2013 | Lin et al. |
| 8,379,267 B2 | 2/2013 | Mestha et al. |
| 8,396,644 B2 | 3/2013 | Kabashima et al. |
| 8,402,268 B2 | 3/2013 | Dierickx |
| 8,418,441 B2 | 4/2013 | He et al. |
| 8,453,431 B2 | 6/2013 | Wang et al. |
| 8,473,079 B2 | 6/2013 | Havlena |
| 8,478,506 B2 | 7/2013 | Grichnik et al. |
| RE44,452 E | 8/2013 | Stewart et al. |
| 8,504,175 B2 | 8/2013 | Pekar et al. |
| 8,505,278 B2 | 8/2013 | Farrell et al. |
| 8,543,170 B2 | 9/2013 | Mazzara, Jr. et al. |
| 8,555,613 B2 | 10/2013 | Wang et al. |
| 8,571,689 B2 | 10/2013 | Machiara et al. |
| 8,596,045 B2 | 12/2013 | Tuomivaara et al. |
| 8,620,461 B2 | 12/2013 | Kihas |
| 8,634,940 B2 | 1/2014 | Macharia et al. |
| 8,639,925 B2 | 1/2014 | Schuetze |
| 8,649,884 B2 | 2/2014 | MacArthur et al. |
| 8,649,961 B2 | 2/2014 | Hawkins et al. |
| 8,667,288 B2 | 3/2014 | Yavuz |
| 8,694,197 B2 | 4/2014 | Rajagopalan et al. |
| 8,700,291 B2 | 4/2014 | Herrmann |
| 8,751,241 B2 | 6/2014 | Oesterling et al. |
| 8,762,026 B2 | 6/2014 | Wolfe et al. |
| 8,763,377 B2 | 7/2014 | Yacoub |
| 8,768,996 B2 | 7/2014 | Shokrollahi et al. |
| 8,813,690 B2 | 8/2014 | Kumar et al. |
| 8,825,243 B2 | 9/2014 | Yang et al. |
| 8,839,967 B2 | 9/2014 | Schneider et al. |
| 8,867,746 B2 | 10/2014 | Ceskutti et al. |
| 8,892,221 B2 | 11/2014 | Kram et al. |
| 8,899,018 B2 | 12/2014 | Frazier et al. |
| 8,904,760 B2 | 12/2014 | Mital |
| 8,983,069 B2 | 3/2015 | Merchan et al. |
| 9,100,193 B2 | 8/2015 | Newsome et al. |
| 9,141,996 B2 | 9/2015 | Christensen et al. |
| 9,170,573 B2 | 10/2015 | Kihas |
| 9,175,595 B2 | 11/2015 | Ceynow et al. |
| 9,223,301 B2 | 12/2015 | Stewart et al. |
| 9,243,576 B2 | 1/2016 | Yu et al. |
| 9,253,200 B2 | 2/2016 | Schwarz et al. |

(56) References Cited

U.S. PATENT DOCUMENTS

| | | |
|---|---|---|
| 9,325,494 B2 | 4/2016 | Boehl |
| 9,367,701 B2 | 6/2016 | Merchan et al. |
| 9,367,968 B2 | 6/2016 | Giraud et al. |
| 9,483,881 B2 | 11/2016 | Comeau et al. |
| 9,560,071 B2 | 1/2017 | Ruvio et al. |
| 9,779,742 B2 | 10/2017 | Newsome, Jr. |
| 2002/0112469 A1 | 8/2002 | Kanazawa et al. |
| 2004/0006973 A1 | 1/2004 | Makki et al. |
| 2004/0086185 A1 | 5/2004 | Sun |
| 2004/0144082 A1 | 7/2004 | Mianzo et al. |
| 2004/0199481 A1 | 10/2004 | Hartman et al. |
| 2004/0226287 A1 | 11/2004 | Edgar et al. |
| 2005/0171667 A1 | 8/2005 | Morita |
| 2005/0187643 A1 | 8/2005 | Sayyar-Rodsar et al. |
| 2005/0193739 A1 | 9/2005 | Brunnell et al. |
| 2005/0210868 A1 | 9/2005 | Funabashi |
| 2006/0047607 A1 | 3/2006 | Boyden et al. |
| 2006/0111881 A1 | 5/2006 | Jackson |
| 2006/0137347 A1 | 6/2006 | Stewart et al. |
| 2006/0168945 A1 | 8/2006 | Samad et al. |
| 2006/0185626 A1 | 8/2006 | Allen et al. |
| 2006/0212140 A1 | 9/2006 | Brackney |
| 2007/0144149 A1 | 6/2007 | Kolavennu et al. |
| 2007/0156259 A1 | 7/2007 | Baramov et al. |
| 2007/0240213 A1 | 10/2007 | Karam et al. |
| 2007/0261648 A1 | 11/2007 | Reckels et al. |
| 2007/0275471 A1 | 11/2007 | Coward |
| 2008/0010973 A1 | 1/2008 | Gimbres |
| 2008/0103747 A1 | 5/2008 | Macharia et al. |
| 2008/0132178 A1 | 6/2008 | Chatterjee et al. |
| 2008/0208778 A1 | 8/2008 | Sayyar-Rodsar et al. |
| 2008/0289605 A1 | 11/2008 | Ito |
| 2009/0172416 A1 | 7/2009 | Bosch et al. |
| 2009/0312998 A1 | 12/2009 | Berckmans et al. |
| 2010/0122523 A1 | 5/2010 | Vosz |
| 2010/0126481 A1 | 5/2010 | Willi et al. |
| 2010/0300069 A1 | 12/2010 | Herrmann et al. |
| 2011/0056265 A1 | 3/2011 | Yacoub |
| 2011/0060424 A1 | 3/2011 | Havlena |
| 2011/0125295 A1 | 5/2011 | Bednasch et al. |
| 2011/0131017 A1 | 6/2011 | Cheng et al. |
| 2011/0167025 A1 | 7/2011 | Danai et al. |
| 2011/0173315 A1 | 7/2011 | Aguren |
| 2011/0264353 A1 | 10/2011 | Atkinson et al. |
| 2011/0270505 A1 | 11/2011 | Chaturvedi et al. |
| 2012/0024089 A1 | 2/2012 | Couey et al. |
| 2012/0109620 A1 | 5/2012 | Gaikwad et al. |
| 2012/0174187 A1 | 7/2012 | Argon et al. |
| 2012/0180468 A1* | 7/2012 | Knapp .................. B60K 25/08 60/407 |
| 2013/0024069 A1 | 1/2013 | Wang et al. |
| 2013/0067894 A1 | 3/2013 | Stewart et al. |
| 2013/0111878 A1 | 5/2013 | Pachner et al. |
| 2013/0111905 A1 | 5/2013 | Pekar et al. |
| 2013/0131954 A1 | 5/2013 | Yu et al. |
| 2013/0131956 A1 | 5/2013 | Thibault et al. |
| 2013/0158834 A1 | 6/2013 | Wagner et al. |
| 2013/0204403 A1 | 8/2013 | Zheng et al. |
| 2013/0242706 A1 | 9/2013 | Newsome, Jr. |
| 2013/0326232 A1 | 12/2013 | Lewis et al. |
| 2013/0326630 A1 | 12/2013 | Argon |
| 2013/0338900 A1 | 12/2013 | Ardanese et al. |
| 2014/0032189 A1 | 1/2014 | Hehle et al. |
| 2014/0034460 A1 | 2/2014 | Chou |
| 2014/0171856 A1 | 6/2014 | McLaughlin et al. |
| 2014/0258736 A1 | 9/2014 | Merchan et al. |
| 2014/0270163 A1 | 9/2014 | Merchan |
| 2014/0316683 A1 | 10/2014 | Whitney et al. |
| 2014/0318216 A1 | 10/2014 | Singh |
| 2014/0343713 A1 | 11/2014 | Ziegler et al. |
| 2014/0358254 A1 | 12/2014 | Chu et al. |
| 2015/0121071 A1 | 4/2015 | Schwarz et al. |
| 2015/0275783 A1 | 10/2015 | Wong et al. |
| 2015/0321642 A1 | 11/2015 | Schwepp et al. |
| 2015/0324576 A1 | 11/2015 | Quirant et al. |
| 2015/0334093 A1 | 11/2015 | Mueller |
| 2015/0354877 A1 | 12/2015 | Burns et al. |
| 2016/0003180 A1 | 1/2016 | McNulty et al. |
| 2016/0043832 A1 | 2/2016 | Ahn et al. |
| 2016/0108732 A1 | 4/2016 | Huang et al. |
| 2016/0127357 A1 | 5/2016 | Zibuschka et al. |
| 2016/0216699 A1 | 7/2016 | Pekar et al. |
| 2016/0239593 A1 | 8/2016 | Pekar et al. |
| 2016/0259584 A1 | 9/2016 | Schlottmann et al. |
| 2016/0330204 A1 | 11/2016 | Baur et al. |
| 2016/0344705 A1 | 11/2016 | Stumpf et al. |
| 2016/0362838 A1 | 12/2016 | Badwe et al. |
| 2016/0365977 A1 | 12/2016 | Boutros et al. |
| 2017/0031332 A1 | 2/2017 | Santin |
| 2017/0048063 A1 | 2/2017 | Mueller |
| 2017/0126701 A1 | 5/2017 | Glas et al. |
| 2017/0218860 A1 | 8/2017 | Pachner et al. |
| 2017/0300713 A1 | 10/2017 | Fan et al. |
| 2017/0306871 A1 | 10/2017 | Fuxman et al. |
| 2017/0320481 A1* | 11/2017 | Johannesson Mardh ................ B60W 20/15 |

FOREIGN PATENT DOCUMENTS

| | | |
|---|---|---|
| DE | 19628796 C1 | 10/1997 |
| DE | 10219382 A1 | 11/2002 |
| DE | 102009016509 A1 | 10/2010 |
| DE | 102011103346 A1 | 8/2012 |
| EP | 0301527 A2 | 2/1989 |
| EP | 0877309 B1 | 6/2000 |
| EP | 1134368 A2 | 9/2001 |
| EP | 1180583 A2 | 2/2002 |
| EP | 1221544 A2 | 7/2002 |
| EP | 1245811 A2 | 10/2002 |
| EP | 1273337 A1 | 1/2003 |
| EP | 0950803 B1 | 9/2003 |
| EP | 1420153 A2 | 5/2004 |
| EP | 1447727 A2 | 8/2004 |
| EP | 1498791 A1 | 1/2005 |
| EP | 1425642 B1 | 11/2005 |
| EP | 1686251 A1 | 8/2006 |
| EP | 1399784 B1 | 10/2007 |
| EP | 2107439 A1 | 10/2009 |
| EP | 2146258 A1 | 1/2010 |
| EP | 1794339 B1 | 7/2011 |
| EP | 1529941 B1 | 11/2011 |
| EP | 2543845 A1 | 1/2013 |
| EP | 2551480 A1 | 1/2013 |
| EP | 2589779 A2 | 5/2013 |
| EP | 2617975 A1 | 7/2013 |
| EP | 2267559 B1 | 1/2014 |
| EP | 2919079 A2 | 9/2015 |
| JP | 59190433 A | 10/1984 |
| JP | 2010282618 A | 12/2010 |
| WO | 0144629 A2 | 6/2001 |
| WO | 0169056 A1 | 9/2001 |
| WO | 0232552 A1 | 4/2002 |
| WO | 02097540 A1 | 12/2002 |
| WO | 02101208 A1 | 12/2002 |
| WO | 03023538 A2 | 3/2003 |
| WO | 03048533 A1 | 6/2003 |
| WO | 03065135 A1 | 8/2003 |
| WO | 03078816 A1 | 9/2003 |
| WO | 03102394 A1 | 12/2003 |
| WO | 2004027230 A1 | 4/2004 |
| WO | 2006021437 A1 | 3/2006 |
| WO | 2007078907 A2 | 7/2007 |
| WO | 2008033800 A2 | 3/2008 |
| WO | 2008115911 A1 | 9/2008 |
| WO | 2011162706 A1 | 12/2011 |
| WO | 2012076838 A2 | 6/2012 |
| WO | 2013119665 A1 | 8/2013 |
| WO | 20140149043 A1 | 9/2014 |

(56) References Cited

FOREIGN PATENT DOCUMENTS

| WO | 2014165439 A2 | 10/2014 |
|---|---|---|
| WO | 2016053194 A1 | 4/2016 |

OTHER PUBLICATIONS

Diehl et al., "Efficient Numerical Methods for Nonlinear MPC and Moving Horizon Estimation," Int. Workshop on Assessment and Future Directions of NMPC, 24 pages, Pavia, Italy, Sep. 5-9, 2008.
Ding, "Characterising Combustion in Diesel Engines, Using Parameterised Finite Stage Cylinder Process Models," 281 pages, Dec. 21, 2011.
Docquier et al., "Combustion Control and Sensors: a Review," Progress in Energy and Combustion Science, vol. 28, pp. 107-150, 2002.
Dunbar, "Model Predictive Control: Extension to Coordinated Multi-Vehicle Formations and Real-Time Implementation," CDS Technical Report 01-016, 64 pages, Dec. 7, 2001.
Egnell, "Combustion Diagnostics by Means of Multizone Heat Release Analysis and NO Calculation," SAE Technical Paper Series 981424, International Spring Fuels and Lubricants Meeting and Exposition, 22 pages, May 4-6, 1998.
Ericson, "NOx Modelling of a Complete Diesel Engine/SCR System," Licentiate Thesis, 57 pages, 2007.
Finesso et al., "Estimation of the Engine-Out NO2/NOx Ration in a Euro VI Diesel Engine," SAE International 2013-01-0317, 15 pages, Apr. 8, 2013.
Fleming, "Overview of Automotive Sensors," IEEE Sensors Journal, vol. 1, No. 4, pp. 296-308, Dec. 2001.
Ford Motor Company, "2012 My OBD System Operation Summary for 6.7L Diesel Engines," 149 pages, Apr. 21, 2011.
Formentin et al., "NOx Estimation in Diesel Engines Via In-Cylinder Pressure Measurement," IEEE Transactions on Control Systems Technology, vol. 22, No. 1, pp. 396-403, Jan. 2014.
Galindo, "An On-Engine Method for Dynamic Characterisation of NOx Concentration Sensors," Experimental Thermal and Fluid Science, vol. 35, pp. 470-476, 2011.
Gamma Technologies, "Exhaust Aftertreatment with GT-Suite," 2 pages, Jul. 17, 2014.
GM "Advanced Diesel Technology and Emissions," powertrain technologies—engines, 2 pages, prior to Feb. 2, 2005.
Goodwin, "Researchers Hack A Corvette's Brakes Via Insurance Black Box," Downloaded from http://www.cnet.com/roadshow/news/researchers-hack-a-corvettes-brakes-via-insurance-black-box/, 2 pages, Aug. 2015.
Greenberg, "Hackers Remotely Kill A Jeep On The Highway—With Me In It," Downloaded from http://www.wired.com/2015/07/hackers-remotely-kill-jeep-highway/, 24 pages, Jul. 21, 2015.
Guardiola et al., "A Bias Correction Method for Fast Fuel-to-Air Ratio Estimation in Diesel Engines," Proceedings of the Institution of Mechanical Engineers, Part D: Journal of Automobile Engineering, vol. 227, No. 8, pp. 1099-1111, 2013.
Guardiola et al., "A Computationally Efficient Kalman Filter Based Estimator for Updating Look-Up Tables Applied to NOx Estimation in Diesel Engines," Control Engineering Practice, vol. 21, pp. 1455-1468.
Guerreiro et al., "Trajectory Tracking Nonlinear Model Predictive Control for Autonomous Surface Craft," Proceedings of the European Control Conference, Budapest, Hungary, 6 pages, Aug. 2009.
Guzzella et al., "Introduction to Modeling and Control of Internal Combustion Engine Systems," 303 pages, 2004.
Guzzella, et al., "Control of Diesel Engines," IEEE Control Systems Magazine, pp. 53-71, Oct. 1998.
Hahlin, "Single Cylinder ICE Exhaust Optimization," Master's Thesis, retrieved from https://pure.ltu.se/portal/files/44015424/LTU-EX-2013-43970821.pdf, 50 pages, Feb. 1, 2014.
Hammacher Schlemmer, "The Windshield Heads Up Display," Catalog, p. 47, prior to Apr. 26, 2016.
Havelena, "Componentized Architecture for Advanced Process Management," Honeywell International, 42 pages, 2004.
Heywood, "Pollutant Formation and Control," Internal Combustion Engine Fundamentals, pp. 567-667, 1988.
Hiranuma, et al., "Development of DPF System for Commercial Vehicle—Basic Characteristic and Active Regeneration Performance," SAE Paper No. 2003-01-3182, Mar. 2003.
Hirsch et al., "Dynamic Engine Emission Models," Automotive Model Predictive Control, Chapter 5, 18 pages, LNCIS 402, 2012.
Hirsch et al., "Grey-Box Control Oriented Emissions Models," The International Federation of Automatic Control (IFAC), Proceedings of the 17th World Congress, pp. 8514-8519, Jul. 6-11, 2008.
Hockerdal, "EKF-based Adaptation of Look-Up Tables with an Air Mass-Flow Sensor Application," Control Engineering Practice, vol. 19, 12 pages, 2011.
Honeywell, "Profit Optimizer A Distributed Quadratic Program (DQP) Concepts Reference," 48 pages, prior to Feb. 2, 2005.
http://nexceris.com/news/nextech-materials/, "NEXTECH Materials is Now NEXCERIS," 7 pages, printed Oct. 4, 2016.
http://www.arb.ca.gov/msprog/obdprog/hdobdreg.htm, "Heavy-Duty OBD Regulations and Rulemaking," 8 pages, printed Oct. 4, 2016.
http://www.not2fast.wryday.com/turbo/glossary/turbo_glossary.shtml, "Not2Fast: Turbo Glossary," 22 pages, printed Oct. 1, 2004.
http://www.tai-cwv.com/sbl106.0.html, "Technical Overview—Advanced Control Solutions," 6 pages, printed Sep. 9, 2004.
https://www.dieselnet.com/standards/US/obd.php, "Emission Standards: USA: On-Board Diagnostics," 6 pages, printed Oct. 3, 2016.
https://www.en.wikipedia.org/wiki/Public-key_cryptography, "Public-Key Cryptography," 14 pages, printed Feb. 26, 2016.
Ishida et al., "An Analysis of the Added Water Effect on NO Formation in D.I. Diesel Engines," SAE Technical Paper Series 941691, International Off-Highway and Power-Plant Congress and Exposition, 13 pages, Sep. 12-14, 1994.
Ishida et al., "Prediction of NOx Reduction Rate Due to Port Water Injection in a DI Diesel Engine," SAE Technical Paper Series 972961, International Fall Fuels and Lubricants Meeting and Exposition, 13 pages, Oct. 13-16, 1997.
Jensen, "The 13 Monitors of an OBD System," http://www.oemoffhighway.com/article/1 0855512/the-13-monito . . . , 3 pages, printed Oct. 3, 2016.
Johansen et al., "Hardware Architecture Design for Explicit Model Predictive Control," Proceedings of ACC, 6 pages, 2006.
Johansen et al., "Hardware Synthesis of Explicit Model Predictive Controllers," IEEE Transactions on Control Systems Technology, vol. 15, No. 1, Jan. 2007.
Jonsson, "Fuel Optimized Predictive Following in Low Speed Conditions," Master's Thesis, 46 pages, Jun. 28, 2003.
Kelly, et al., "Reducing Soot Emissions from Diesel Engines Using One Atmosphere Uniform Glow Discharge Plasma," SAE Paper No. 2003-01-1183, Mar. 2003.
Keulen et al., "Predictive Cruise Control in Hybrid Electric Vehicles," World Electric Journal, vol. 3, ISSN 2032-6653, 11 pages, May 2009.
Khair et al., "Emission Formation in Diesel Engines," Downloaded from https://www.dieselnet.com/tech/diesel_emiform.php, 33 pages, printed Oct. 14, 2016.
Kihas et al., "Chapter 14, Diesel Engine SCR Systems: Modeling Measurements and Control," Catalytic Reduction Technology (book), Part 1, Chapter 14, prior to Jan. 29, 2016.
Kolmanovsky et al., "Issues in Modeling and Control of Intake Flow in Variable Geometry Turbocharged Engines", 18th IFIP Conf. System Modeling and Optimization, pp. 436-445, Jul. 1997.
Krause et al., "Effect of Inlet Air Humidity and Temperature on Diesel Exhaust Emissions," SAE International Automotive Engineering Congress, 8 pages, Jan. 8-12, 1973.
Kulhavy et al. "Emerging Technologies for Enterprise Optimization in the Process Industries," Honeywell, 12 pages, Dec. 2000.
Lavoie et al., "Experimental and Theoretical Study of Nitric Oxide Formation in Internal Combustion Engines," Combustion Science and Technology, vol. 1, pp. 313-326, 1970.

(56) References Cited

OTHER PUBLICATIONS

"Aftertreatment Modeling of RCCI Engine During Transient Operation," University of Wisconsin—Engine Research Center, 1 page, May 31, 2014.
"Chapter 14: Pollutant Formation," Fluent Manual, Release 15.0, Chapter 14, pp. 313-345, prior to Jan. 29, 2016.
"Chapter 21, Modeling Pollutant Formation," Fluent Manual, Release 12.0, Chapter 21, pp. 21-1-21-54, Jan. 30, 2009.
"J1979 E/E Diagnostic Test Modules," Proposed Regulation, Vehicle E.E. System Diagnostic Standards Committee, 1 page, Sep. 28, 2010.
"MicroZed Zynq Evaluation and Development and System on Module, Hardware User Guide," Avnet Electronics Marketing, Version 1.6, Jan. 22, 2015.
"Model Predictive Control Toolbox Release Notes," The Mathworks, 24 pages, Oct. 2008.
"Model Predictive Control," Wikipedia, pp. 1-5, Jan. 22, 2009. http://en.wikipedia.org/w/index.php?title=Special:Book&bookcmd=download&collecton_id=641cd1b5da77cc22&writer=rl&return_to=Model predictive control, retrieved Nov. 20, 2012.
"MPC Implementation Methods for the Optimization of the Response of Control Valves to Reduce Variability," Advanced Application Note 002, Rev. A, 10 pages, 2007.
"SCR, 400-csi Coated Catalyst," Leading NOx Control Technologies Status Summary, 1 page prior to Feb. 2, 2005.
Actron, "Elite AutoScanner Kit—Enhanced OBD I & II Scan Tool, OBD 1300," Downloaded from https://actron.com/content/elite-autoscanner-kit-enhanced-obd-i-and-obd-ii-scan-tool?utm_ . . . , 5 pages, printed Sep. 27, 2016.
Advanced Petroleum-Based Fuels-Diesel Emissions Control (APBF-DEC) Project, "Quarterly Update," No. 7, 6 pages, Fall 2002.
Allanson, et al., "Optimizing the Low Temperature Performance and Regeneration Efficiency of the Continuously Regenerating Diesel Particulate Filter System," SAE Paper No. 2002-01-0428, 8 pages, Mar. 2002.
Amstuz, et al., "EGO Sensor Based Robust Output Control of EGR in Diesel Engines," IEEE TCST, vol. 3, No. 1, 12 pages, Mar. 1995.
Andersson et al., "A Predictive Real Time NOx Model for Conventional and Partially Premixed Diesel Combustion," SAE International 2006-01-3329, 10 pages, 2006.
Andersson et al., "A Real Time NOx Model for Conventional and Partially Premixed Diesel Combustion," SAE Technical Paper Series 2006-01-0195, 2006 SAE World Congress, 13 pages, Apr. 3-6, 2006.
Andersson et al., "Fast Physical NOx Prediction in Diesel Engines, The Diesel Engine: The Low CO2 and Emissions Reduction Challenge," Conference Proceedings, Lyon, 2006. Unable to Obtain a Copy of This Reference.
Arregle et al., "On Board NOx Prediction in Diesel Engines: A Physical Approach," Automotive Model Predictive Control, Models Methods and Applications, Chapter 2, 14 pages, 2010.
Asprion, "Optimal Control of Diesel Engines," PHD Thesis, Diss ETH No. 21593, 436 pages, 2013.
Assanis et al., "A Predictive Ignition Delay Correlation Under Steady-State and Transient Operation of a Direct Injection Diesel Engine," ASME, Journal of Engineering for Gas Turbines and Power, vol. 125, pp. 450-457, Apr. 2003.
Axehill et al., "A Dual Gradiant Projection Quadratic Programming Algorithm Tailored for Model Predictive Control," Proceedings of the 47th IEEE Conference on Decision and Control, Cancun Mexico, pp. 3057-3064, Dec. 9-11, 2008.
Axehill et al., "A Dual Gradient Projection Quadratic Programming Algorithm Tailored for Mixed Integer Predictive Control," Technical Report from Linkopings Universitet, Report No. Li-Th-ISY-R-2833, 58 pages, Jan. 31, 2008.
Baffi et al., "Non-Linear Model Based Predictive Control Through Dynamic Non-Linear Partial Least Squares," Trans IChemE, vol. 80, Part A, pp. 75-86, Jan. 2002.

Bako et al., "A Recursive Identification Algorithm for Switched Linear/Affine Models," Nonlinear Analysis: Hybrid Systems, vol. 5, pp. 242-253, 2011.
Barba et al., "A Phenomenological Combustion Model for Heat Release Rate Prediction in High-Speed DI Diesel Engines with Common Rail Injection," SAE Technical Paper Series 2000-01-2933, International Fall Fuels and Lubricants Meeting Exposition, 15 pages, Oct. 16-19, 2000.
Bemporad et al., "Model Predictive Control Toolbox 3, User's Guide," Matlab Mathworks, 282 pages, 2008.
Bemporad et al., "The Explicit Linear Quadratic Regulator for Constrained Systems," Automatica, 38, pp. 3-20, 2002.
Bemporad, "Model Predictive Control Based on Linear Programming—The Explicit Solution," IEEE Transactions on Automatic Control, vol. 47, No. 12, pp. 1974-1984, Dec. 2002.
Bemporad, "Model Predictive Control Design: New Trends and Tools," Proceedings of the 45th IEEE Conference on Decision & Control, pp. 6678-6683, Dec. 13-15, 2006.
Bemporad, et al., "Explicit Model Predictive Control," 1 page, prior to Feb. 2, 2005.
Bertsekas, "On the Goldstein-Levitin-Polyak Gradient Projection Method," IEEE Transactions on Automatic Control, vol. AC-21, No. 2, pp. 174-184, Apr. 1976.
Bertsekas, "Projected Newton Methods for Optimization Problems with Simple Constraints*," SIAM J. Control and Optimization, vol. 20, No. 2, pp. 221-246, Mar. 1982.
Blanco-Rodriguez, "Modelling and Observation of Exhaust Gas Concentrations for Diesel Engine Control," Phd Dissertation, 242 pages, Sep. 2013.
Blue Streak Electronics Inc., "Ford Modules," 1 page, May 12, 2010.
Borrelli et al., "An MPC/Hybrid System Approach to Traction Control," IEEE Transactions on Control Systems Technology, vol. 14, No. 3, pp. 541-553, May 2006.
Borrelli, "Constrained Optimal Control of Linear and Hybrid Systems," Lecture Notes in Control and Information Sciences, vol. 290, 2003.
Borrelli, "Discrete Time Constrained Optimal Control," A Dissertation Submitted to the Swiss Federal Institute of Technology (ETH) Zurich, Diss. ETH No. 14666, 232 pages, Oct. 9, 2002.
Bourn et al., "Advanced Compressor Engine Controls to Enhance Operation, Reliability and Integrity," Southwest Research Institute, DOE Award No. DE-FC26-03NT41859, SwRI Project No. 03.10198, 60 pages, Mar. 2004.
Catalytica Energy Systems, "Innovative NOx Reduction Solutions for Diesel Engines," 13 pages, 3rd Quarter, 2003.
Charalampidis et al., "Computationally Efficient Kalman Filtering for a Class of Nonlinear Systems," IEEE Transactions an Automatic Control, vol. 56, No. 3, pp. 483-491, Mar. 2011.
Chatterjee, et al. "Catalytic Emission Control for Heavy Duty Diesel Engines," JM, 46 pages, prior to Feb. 2, 2005.
Chew, "Sensor Validation Scheme with Virtual NOx Sensing for Heavy Duty Diesel Engines," Master's Thesis, 144 pages, 2007.
European Search Report for EP Application No. 11167549.2 dated Nov. 27, 2012.
European Search Report for EP Application No. 12191156.4-1603 dated Feb. 9, 2015.
European Search Report for EP Application No. EP 10175270.7-2302419 dated Jan. 16, 2013.
European Search Report for EP Application No. EP 15152957.5-1807 dated Feb. 10, 2015.
The Extended European Search Report for EP Application No. 15155295.7-1606, dated Aug. 4, 2015.
The Extended European Search Report for EP Application No. 15179435.1, dated Apr. 1, 2016.
U.S. Appl. No. 15/005,406, filed Jan. 25, 2016.
U.S. Appl. No. 15/011,445, filed Jan. 29, 2016.
De Oliveira, "Constraint Handling and Stability Properties of Model Predictive Control," Carnegie Institute of Technology, Department of Chemical Engineering, Paper 197, 64 pages, Jan. 1, 1993.
The Extended European Search Report for EP Application No. 17151521.6, dated Oct. 23, 2017.

(56) References Cited

OTHER PUBLICATIONS

The Extended European Search Report for EP Application No. 17163452.0, dated Sep. 26, 2017.
Greenberg, "Hackers Cut a Corvette's Brakes Via A Common Car Gadget," downloaded from https://www.wired.com2015/08/hackers-cut-corvettes-brakes-v . . . , 14 pages, Aug. 11, 2015, printed Dec. 11, 2017.
http://www.blackpoolcommunications.com/products/alarm-immo . . . , "OBD Security OBD Port Protection—Alarms & Immobilizers . . . ," 1 page, printed Jun. 5, 2017.
http://www.cnbc.com/2016/09/20/chinese-company-hacks-tesla-car-remotely.html, "Chinese Company Hacks Tesla Car Remotely," 3 pages, Sep. 20, 2016.
ISO, "ISO Document No. 13185-2:2015(E)," 3 pages, 2015.
Locker, et al., "Diesel Particulate Filter Operational Characterization," Corning Incorporated, 10 pages, prior to Feb. 2, 2005.
Lu, "Challenging Control Problems and Engineering Technologies in Enterprise Optimization," Honeywell Hi-Spec Solutions, 30 pages, Jun. 4-6, 2001.
Maciejowski, "Predictive Control with Constraints," Prentice Hall, Pearson Education Limited, 4 pages, 2002.
Manchur et al., "Time Resolution Effects on Accuracy of Real-Time NOx Emissions Measurements," SAE Technical Paper Series 2005-01-0674, 2005 SAE World Congress, 19 pages, Apr. 11-14, 2005.
Mariethoz et al., "Sensorless Explicit Model Predictive Control of the DC-DC Buck Converter with Inductor Current Limitation," IEEE Applied Power Electronics Conference and Exposition, pp. 1710-1715, 2008.
Marjanovic, "Towards a Simplified Infinite Horizon Model Predictive Controller," 6 pages, Proceedings of the 5th Asian Control Conference, 6 pages, Jul. 20-23, 2004.
Mehta, "The Application of Model Predictive Control to Active Automotive Suspensions," 56 pages, May 17, 1996.
Mohammadpour et al., "A Survey on Diagnostics Methods for Automotive Engines," 2011 American Control Conference, pp. 985-990, Jun. 29-Jul. 1, 2011.
Moore, "Living with Cooled-EGR Engines," Prevention Illustrated, 3 pages, Oct. 3, 2004.
Moos, "Catalysts as Sensors—A Promising Novel Approach in Automotive Exhaust Gas Aftertreatment," http://www.mdpi.com/1424-8220/10/7/6773htm, 10 pages, Jul. 13, 2010.
Murayama et al., "Speed Control of Vehicles with Variable Valve Lift Engine by Nonlinear MPC," ICROS-SICE International Joint Conference, pp. 4128-4133, 2009.
National Renewable Energy Laboratory (NREL), "Diesel Emissions Control—Sulfur Effects Project (DECSE) Summary of Reports," U.S. Department of Energy, 19 pages, Feb. 2002.
Olsen, "Analysis and Simulation of the Rate of Heat Release (ROHR) in Diesel Engines," MSc-Assignment, 105 pages, Jun. 2013.
Ortner et al., "MPC for a Diesel Engine Air Path Using an Explicit Approach for Constraint Systems," Proceedings of the 2006 IEEE Conference on Control Applications, Munich Germany, pp. 2760-2765, Oct. 4-6, 2006.
Ortner et al., "Predictive Control of a Diesel Engine Air Path," IEEE Transactions on Control Systems Technology, vol. 15, No. 3, pp. 449-456, May 2007.
Pannocchia et al., "Combined Design of Disturbance Model and Observer for Offset-Free Model Predictive Control," EEE Transactions on Automatic Control, vol. 52, No. 6, 6 pages, 2007.
Patrinos et al., "A Global Piecewise Smooth Newton Method for Fast Large-Scale Model Predictive Control," Tech Report TR2010-02, National Technical University of Athens, 23 pages, 2010.
Payri et al., "Diesel NOx Modeling with a Reduction Mechanism for the Initial NOx Coming from EGR or Re-Entrained Burned Gases," 2008 World Congress, SAE Technical Paper Series 2008-01-1188, 13 pages, Apr. 14-17, 2008.
Payri et al., "Methodology for Design and Calibration of a Drift Compensation Method for Fuel-to-Air Ratio," SAE International 2012-01-0717, 13 pages, Apr. 16, 2012.
Pipho et al., "NO2 Formation in a Diesel Engine," SAE Technical Paper Series 910231, International Congress and Exposition, 15 pages, Feb. 25-Mar. 1, 1991.
Qin et al., "A Survey of Industrial Model Predictive Control Technology," Control Engineering Practice, 11, pp. 733-764, 2003.
Querel et al., "Control of an SCR System Using a Virtual NOx Sensor," 7th IFAC Symposium on Advances in Automotive Control, The International Federation of Automotive Control, pp. 9-14, Sep. 4-7, 2013.
Rajamani, "Data-based Techniques to Improve State Estimation in Model Predictive Control," Ph.D. Dissertation, 257 pages, 2007.
Rawlings, "Tutorial Overview of Model Predictive Control," IEEE Control Systems Magazine, pp. 38-52, Jun. 2000.
Ricardo Software, "Powertrain Design at Your Fingertips," retrieved from http://www.ricardo.com/PageFiles/864/WaveFlyerA4_4PP.pdf, 2 pages, downloaded Jul. 27, 2015.
Salvat, et al., "Passenger Car Serial Application of a Particulate Filter System on a Common Rail Direct Injection Engine," SAE Paper No. 2000-01-0473, 14 pages, Feb. 2000.
Santin et al., "Combined Gradient/Newton Projection Semi-Explicit QP Solver for Problems with Bound Constraints," 2 pages, prior to Jan. 29, 2016.
Schauffele et al., "Automotive Software Engineering Principles, Processes, Methods, and Tools," SAE International, 10 pages, 2005.
Schilling et al., "A Real-Time Model for the Prediction of the NOx Emissions in DI Diesel Engines," Proceedings of the 2006 IEEE International Conference on Control Applications, pp. 2042-2047, Oct. 4-7, 2006.
Schilling, "Model-Based Detection and Isolation of Faults in the Air and Fuel Paths of Common-Rail DI Diesel Engines Equipped with a Lambda and a Nitrogen Oxides Sensor," Doctor of Sciences Dissertation, 210 pages, 2008.
Shahzad et al., "Preconditioners for Inexact Interior Point Methods for Predictive Control," 2010 American Control Conference, pp. 5714-5719, Jun. 30-Jul. 2010.
Shamma, et al. "Approximate Set-Valued Observers for Nonlinear Systems," IEEE Transactions on Automatic Control, vol. 42, No. 5, May 1997.
Signer et al., "European Programme on Emissions, Fuels and Engine Technologies (EPEFE)—Heavy Duty Diesel Study," International Spring Fuels and Lubricants Meeting, SAE 961074, May 6-8, 1996.
Soltis, "Current Status of NOx Sensor Development," Workshop on Sensor Needs and Requirements for PEM Fuel Cell Systems and Direct-Injection Engines, 9 pages, Jan. 25-26, 2000.
Stefanopoulou, et al., "Control of Variable Geometry Turbocharged Diesel Engines for Reduced Emissions," IEEE Transactions on Control Systems Technology, vol. 8, No. 4, pp. 733-745, Jul. 2000.
Stewart et al., "A Model Predictive Control Framework for Industrial Turbodiesel Engine Control," Proceedings of the 47th IEEE Conference on Decision and Control, 8 pages, 2008.
Stewart et al., "A Modular Model Predictive Controller for Turbodiesel Problems," First Workshop on Automotive Model Predictive Control, Schloss Muhldorf, Feldkirchen, Johannes Kepler University, Linz, 3 pages, 2009.
Storset et al., "Air Charge Estimation for Turbocharged Diesel Engines," vol. 1 Proceedings of the American Control Conference, 8 pages, Jun. 28-30, 2000.
Stradling et al., "The Influene of Fuel Properties and Injection Timing on the Exhaust Emissions and Fuel Consumption of an Iveco Heavy-Duty Diesel Engine," International Spring Fuels and Lubricants Meeting, SAE 971635, May 5-8, 1997.
Takacs et al., "Newton-Raphson Based Efficient Model Predictive Control Applied on Active Vibrating Structures," Proceeding of the European Control Conference 2009, Budapest, Hungary, pp. 2845-2850, Aug. 23-26, 2009.
The MathWorks, "Model-Based Calibration Toolbox 2.1 Calibrate complex powertrain systems," 4 pages, prior to Feb. 2, 2005.
The MathWorks, "Model-Based Calibration Toolbox 2.1.2," 2 pages, prior to Feb. 2, 2005.
Theiss, "Advanced Reciprocating Engine System (ARES) Activities at the Oak Ridge National Lab (ORNL), Oak Ridge National Laboratory," U.S. Department of Energy, 13 pages, Apr. 14, 2004.

(56) References Cited

OTHER PUBLICATIONS

Tondel et al., "An Algorithm for Multi-Parametric Quadratic Programming and Explicit MPC Solutions," Automatica, 39, pp. 489-497, 2003.
Van Den Boom et al., "MPC for Max-Plus-Linear Systems: Closed-Loop Behavior and Tuning," Proceedings of the 2001 American Control Conference, Arlington, Va, pp. 325-330, Jun. 2001.
Van Heiden et al., "Optimization of Urea SCR deNOx Systems for HD Diesel Engines," SAE International 2004-01-0154, 13 pages, 2004.
Van Keulen et al., "Predictive Cruise Control in Hybrid Electric Vehicles," World Electric Vehicle Journal vol. 3, ISSN 2032-6653, pp. 1-11, 2009.
Vdo, "UniNOx-Sensor Specification," Continental Trading GmbH, 2 pages, Aug. 2007.
Vereschaga et al., "Piecewise Affine Modeling of NOx Emission Produced by a Diesel Engine," 2013 European Control Conference (ECC), pp. 2000-2005, Jul. 17-19, 2013.
Wahlstrom et al., "Modelling Diesel Engines with a Variable-Geometry Turbocharger and Exhaust Gas Recirculation by Optimization of Model Parameters for Capturing Non-Linear System Dynamics," (Original Publication) Proceedings of the Institution of Mechanical Engineers, Part D, Journal of Automobile Engineering, vol. 225, No. 7, 28 pages, 2011.
Wang et al., "Fast Model Predictive Control Using Online Optimization," Proceedings of the 17th World Congress, the International Federation of Automatic Control, Seoul, Korea, pp. 6974-6979, Jul. 6-11, 2008.
Wang et al., "PSO-Based Model Predictive Control for Nonlinear Processes," Advances in Natural Computation, Lecture Notes in Computer Science, vol. 3611/2005, 8 pages, 2005.
Wang et al., "Sensing Exhaust NO2 Emissions Using the Mixed Potential Principal," SAE 2014-01-1487, 7 pages, Apr. 1, 2014.
Wilhelmsson et al., "A Fast Physical NOx Model Implemented on an Embedded System," Proceedings of the IFAC Workshop on Engine and Powertrain Control, Simulation and Modeling, pp. 207-215, Nov. 30-Dec. 2, 2009.
Wilhemsson et al., "A Physical Two-Zone NOx Model Intended for Embedded Implementation," SAE 2009-01-1509, 11 pages, 2009.
Winkler et al., "Incorporating Physical Knowledge About the Formation of Nitric Oxides into Evolutionary System Identification," Proceedings of the 20th European Modeling and Simulation Symposium (EMSS), 6 pages, 2008.
Winkler et al., "On-Line Modeling Based On Genetic Programming," 12 pages, International Journal on Intelligent Systems Technologies and Applications 2, 2007.
Winkler et al., "Using Genetic Programming in Nonlinear Model Identification," 99 pages, prior to Jan. 29, 2016.
Winkler et al., "Virtual Sensors for Emissions of a Diesel Engine Produced by Evolutionary System Identification," LNCS, vol. 5717, 8 pages, 2009.
Wong, "CARB Heavy-Duty OBD Update," California Air Resources Board, SAE OBD TOPTEC, Downloaded from http://www.arb.ca.gov/msprog/obdprog/hdobdreg.htm, 72 pages, Sep. 15, 2005.
Wright, "Applying New Optimization Algorithms to Model Predictive Control," 5th International Conference on Chemical Process Control, 10 pages, 1997.
Yao et al., "The Use of Tunnel Concentration Profile Data to Determine the Ratio of NO2/NOx Directly Emitted from Vehicles," HAL Archives, 19 pages, 2005.
Zaman, "Lincoln Motor Company: Case study 2015 Lincoln MKC," Automotive Electronic Design Fundamentals, Chapter 6, 2015.
Zavala et al., "The Advance-Step NMPC Controller: Optimality, Stability, and Robustness," Automatica, vol. 45, pp. 86-93, 2009.
Zeilinger et al., "Real-Time MPC—Stability Through Robust MPC Design," Joint 48th IEEE Conference on Decision and Control and 28th Chinese Control Conference, Shanghai, P.R. China, pp. 3980-3986, Dec. 16-18, 2009.
Zeldovich, "The Oxidation of Nitrogen in Combustion and Explosions," ACTA Physiochimica U.R.S.S., vol. XX1, No. 4, 53 pages, 1946.
Zelenka, et al., "An Active Regeneration as a Key Element for Safe Particulate Trap Use," SAE Paper No. 2001-0103199, 13 pages, Feb. 2001.
Zhu, "Constrained Nonlinear Model Predictive Control for Vehicle Regulation," Dissertation, Graduate School of the Ohio State University, 125 pages, 2008.
Zhuiykov et al., "Development of Zirconia-Based Potentiometric NOx Sensors for Automotive and Energy Industries in the Early 21st Century: What Are the Prospects for Sensors?", Sensors and Actuators B, vol. 121, pp. 639-651, 2007.
Desantes et al., "Development of NOx Fast Estimate Using NOx Sensor," EAEC 2011 Congress, 2011. Unable to Obtain a Copy of This Reference.
Winkler, "Evolutionary System Identification—Modern Approaches and Practical Applications," Kepler Universitat Linz, Reihe C: Technik und Naturwissenschaften, Universitatsverlag Rudolf Trauner, 2009. Unable to Obtain a Copy of This Reference.
Smith, "Demonstration of a Fast Response On-Board NOx Sensor for Heavy-Duty Diesel Vehicles," Technical report, Southwest Research Institute Engine and Vehicle Research Division SwRI Project No. 03-02256 Contract No. 98-302, 2000. Unable to Obtain a Copy of This Reference.
Traver et al., "A Neural Network-Based Virtual NOx Sensor for Diesel Engines," 7 pages, prior to Jan. 29, 2016.
Tschanz et al., "Cascaded Multivariable Control of the Combustion in Diesel Engines," The International Federation of Automatic Control (IFAC), 2012 Workshop on Engine and Powertrain Control, Simulation and Modeling, pp. 25-32, Oct. 23-25, 2012.
Tschanz et al., "Control of Diesel Engines Using NOx-Emission Feedback," International Journal of Engine Research, vol. 14, No. 1, pp. 45-56, 2013.
Tschanz et al., "Feedback Control of Particulate Matter and Nitrogen Oxide Emissions in Diesel Engines," Control Engineering Practice, vol. 21, pp. 1809-1820, 2013.
Turner, "Automotive Sensors, Sensor Technology Series," Momentum Press, Unable to Obtain the Entire Book, a Copy of the Front and Back Covers and Table of Contents are Provided, 2009.
Van Basshuysen et al., "Lexikon Motorentechnik," (Dictionary of Automotive Technology) published by Vieweg Verlag, Wiesbaden 039936, p. 518, 2004. (English Translation).
The Extended European Search Report and Written Opinion for EP Application No. 16181570.9 dated Dec. 12, 2016.

\* cited by examiner

US 11,180,024 B2

SYSTEM AND APPROACH FOR DYNAMIC VEHICLE SPEED OPTIMIZATION

This present application is a divisional of U.S. patent application Ser. No. 15/211,889, filed Jul. 15, 2016, which claims the benefit of U.S. Provisional Patent Application No. 62/201,388, filed Aug. 5, 2015. U.S. Provisional Patent Application No. 62/201,388, filed Aug. 5, 2015, is hereby incorporated by reference. U.S. patent application Ser. No. 15/211,889, filed Jul. 15, 2016, is hereby incorporated by reference.

BACKGROUND

The present disclosure pertains to vehicle systems, and particularly to controlling speeds of a vehicle. More particularly, the disclosure pertains to performance improvement in speed control systems.

SUMMARY

The disclosure reveals systems and approaches for controlling speeds of a vehicle. A vehicle system may include a vehicle, a propulsion device, such as a combustion engine or an electric motor, and a controller in communication with the propulsion device. The propulsion device may at least partially power the vehicle and may consume primary energy, such as fuel or electric energy stored in a battery. The controller may control the propulsion device. In some cases, the controller may control the propulsion device according to a target speed of the vehicle.

The controller may include a model of energy balances of the vehicle and may use the model to estimate energy losses over a travel horizon of the vehicle. The model estimating energy losses over a travel horizon of the vehicle may take into account one or more measures of parameters related to the travel horizon, where the parameters related to the travel horizon may include one or more of a mass of the vehicle and a road grade of a road on which the vehicle is positioned over the travel horizon, and one or more other parameters may be utilized. In some cases, the controller may use the estimated energy losses over the travel horizon of the vehicle to optimize a cost function over the travel horizon and set an actual speed for the vehicle.

DESCRIPTION

Figure 1:
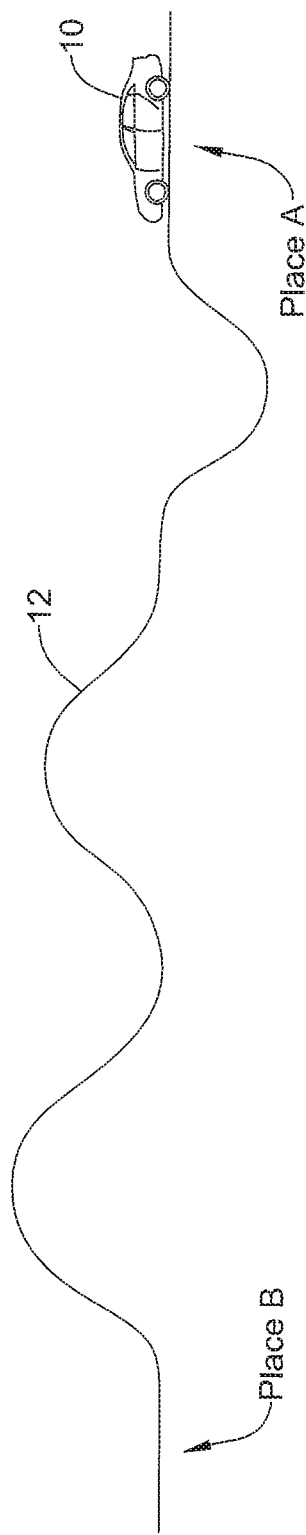
FIG. 1 is a schematic diagram depicting an illustrative travel of a vehicle from place A to place B.

The present system and approach, as described herein and/or shown in the Figures, may incorporate one or more processors, computers, controllers, user interfaces, wireless and/or wire connections, and/or the like, wherever desired.

Typical operation of a vehicle may have the goal to transport people or goods from place A to place B, along a predetermined route. An operator of the vehicle and/or potential passengers of the vehicle, hereafter referred to as users, may have certain expectations and requirements connected to transportation from place A to place B. Illustratively, users may have expectations and/or requirements that have to do with comfort of driving and/or riding, the duration of the transport from place A to place B, fuel required to reach place B from place A, and/or one or more other expectations or requirements. True user expectations and/or requirements, in many cases, may trade-off different individual expectations and/or requirements of a user over a horizon, which may exceed many travel horizons that are practical in context of solving an optimization problem over the travel horizon, and which may possibly even exceed a route of a trip from place A to place B. The expectations and requirements of users may be turned into an optimization issue to maximize overall satisfaction of users of a vehicle.

In some cases, a comfort of driving and/or riding expectation and/or requirement may be expressed in terms of acceleration and/or change of acceleration of the vehicle. For a fuel consumption expectation and/or requirement, one or more different terms may be used. In many cases, a scaled, distance-specific fuel consumption model may be used, but this is not always the case. Illustratively, a scaled, distance-specific fuel consumption related optimization variable used in a cost function may be minimized by an optimizer and/or controller of a vehicle.

In one example, a scaled, distance-specific fuel consumption optimization model may not be desirable for use in an optimization problem that does not solve the optimization problem for the complete remaining route from place A to place B, but rather only for a limited future horizon representing a part of the remaining route to place B. Such limited horizon optimizers that, amongst others minimize the fuel consumption and that do not solve the optimization problem for the entire remaining trip from place A to place B may be expected to become a common solution for real-world implementable vehicle-speed control solutions in next generation vehicle systems.

An issue with optimizing a distance-specific fuel consumption parameter for a travel horizon may be that such an approach does not consider energy consumed, but rather fuel consumed. In particular, optimizing a distance-specific fuel consumption parameter may be related to the fuel mass consumed over a travel horizon by a change in altitude or change in vehicle speed over that travel horizon. A fuel mass flow signal (measured or estimated from propulsion-device operation) may correspond to a flow of chemical energy (e.g., power) invested for propulsion of the vehicle. However, a portion of this chemical energy flow invested may not necessarily be optimizeable because it is outside of the scope of the optimization problem. Additionally, a part of the chemical energy flow invested may be recollected completely or at least partially at the end of the interval and thus may not be necessarily consumed in an energetic sense.

In the general case, fuel consumed may not necessarily be proportional to energy consumed in a context of a user's expectations and/or requirements. This may be so because a part of fuel energy consumed by a propulsion device (e.g., a combustion engine, an electric motor, or other propulsion device) of a vehicle might still be available in a form of an increased potential or kinetic energy in the vehicle at the end of the horizon with respect to the initial level of potential or kinetic energy. In one example, an investment of fuel energy into a vehicle energy (e.g., potential or kinetic energy of the vehicle) over the travel horizon (e.g., when driving uphill or when accelerating), the fuel consumption over the horizon may be higher than for a case where the vehicle energy is equal at a beginning and at an end of the travel horizon. This difference in fuel consumption may lead to a bias of the user-defined trade-off between a user's true expectations and/or requirements if the vehicle energy is ignored in the optimization problem. In another example, if a change in vehicle energy is not considered explicitly in an optimization problem, a fuel-cost over a travel horizon may appear to be higher resulting in over-weighting of the fuel consumption related expectations and/or requirements. Similarly, if a vehicle energy decreases over a travel horizon, the fuel consumption related expectations and/or requirements may be under-weighted.

Further, potential energy of a vehicle with a given mass may change as the vehicle travels. As long as the horizon of at least a portion along a route from place A to place B and/or the vehicle mass are not changed, a potential energy of the vehicle connected to differences in altitude over the horizon may have to be invested and it does not necessarily matter if potential energy is invested with high or lower power (e.g., high or low speed). Further, as speed (e.g., kinetic energy) may change over a travel horizon, the fuel mass flow may be higher during phases of acceleration than in phases of constant speed (e.g., zero acceleration) because additional chemical energy flow may need to be invested to accelerate the vehicle. Therefore, fuel consumption of the vehicle may seem high during acceleration, but the additional kinetic energy at the end of the travel horizon may be available in the vehicle and may be recovered completely for moving the vehicle forward on the route. As a result, there may be a need to correct a fuel energy flow invested over the travel horizon to take into account a change in vehicle potential and kinetic energy when an altitude of a vehicle at an end of a route (e.g., the end of the travel horizon) may be different than an altitude of the vehicle at a beginning of the route (e.g., the beginning of the travel horizon) and/or when a speed the vehicle at an end of a route (e.g., the end of the travel horizon) may be different from a speed of the vehicle at a beginning of a route (e.g., the beginning of the travel horizon).

To address the bias issue that may result when distance-specific fuel consumption parameters are optimized without considering vehicle energy, a more appropriate optimization approach may be used such that true user expectations and/or requirements may be met when optimizing a vehicle speed trajectory from place A to place B. A more appropriate optimization approach that addresses the bias issue may include an optimization approach that uses a cost function taking into consideration energy losses of a vehicle over a travel horizon by subtracting the fuel-energy parameters required for a change in kinetic energy of the vehicle and for the change in potential energy of the vehicle from the fuel energy invested over a travel horizon. That is, instead of considering fuel energy or fuel power (e.g., fuel mass flow) in a cost function of an optimization problem, the cost function of the optimization problem may consider energy losses (e.g., a part of the fuel mass flow that is being consumed by losses, such as friction, drag, and so forth). In one example, a fuel mass flow signal that may typically be used as an input for an optimization problem may be corrected by subtracting the rate of potential energy change of the vehicle and by subtracting the rate of kinetic energy change of the vehicle, both corrected by a lower heating value of fuel in the vehicle.

To make use of an optimization approach for controlling a vehicle (e.g., a vehicle speed or other vehicle variable), a vehicle controller may utilize a mathematical model of energy flows and/or balances of the vehicle. Further, expectations and/or requirements of users and the relative importance of each of the expectations and/or requirements may be considered in the optimization approach. Some of the expectations and/or requirements of users may include, but are not limited to, limits on fuel consumption, limits on deviation from a desired speed (e.g., a target speed), limits on speed, limits on deviation from desired distance from or to a lead vehicle (e.g., a vehicle in front of a subject vehicle for which optimization is desired), limits on a distance to a lead vehicle, limits on vehicle acceleration, and/or other expectations and/or requirements of users.

In some cases, the optimization approach for controlling a vehicle may consider estimated and/or measured values of the vehicle mass and/or a current or future road grade of a road on which the vehicle travels from place A to place B. Such mass of the vehicle and road grade of a road on which the vehicle travels may be measured by sensors on the vehicle. Alternatively, or in addition, a road grade may be provided to a controller of the vehicle via computer program (e.g., a maps/directions program) and/or via a positioning system (e.g., a global position system (GPS) or other positioning system) in communication with the controller of the vehicle.

The disclosed optimization approach using a model of vehicle energy flows and balances may be further described below. Illustratively, the model of vehicle energy flows and balances may be used to estimate the power losses of the vehicle over a travel horizon. The calculated power losses may then be used in a cost function of the optimization problem to minimize a trade-off of user expectations and/or requirements (e.g., a total cost) over the travel horizon.

Turning to the figures, FIG. 1 depicts a schematic elevation view of an illustrative vehicle 10 on a route 12. The vehicle 10 may be traveling from place A to place B along the route 12 or at least part of the route from place A to place B. Any interval between the current vehicle position to place B may represent a travel horizon where the travel horizon may be measured in time (e.g., a time interval) or distance (e.g., a distance interval), or both time and distance.

Figure 2:
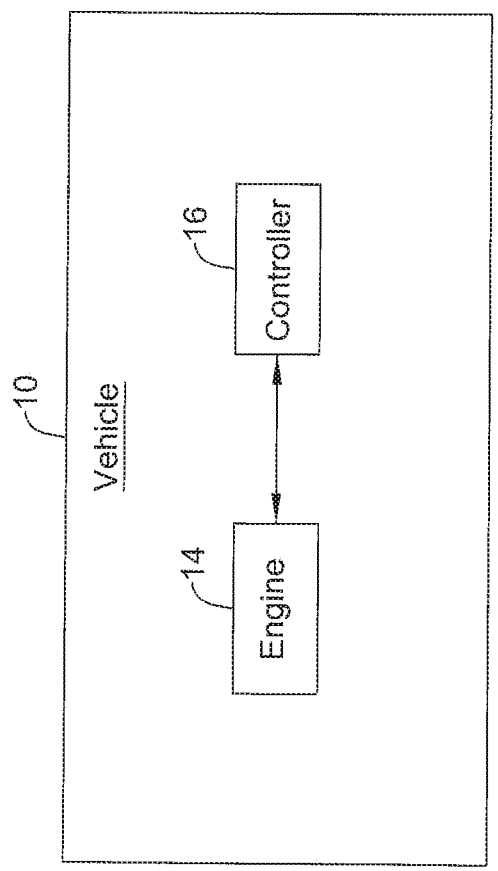
FIG. 2 is a schematic block diagram of an illustrative vehicle.

FIG. 2 depicts illustrative components of a vehicle 10. For example, as shown in FIG. 2, the vehicle 10 may include a propulsion device 14, such as a combustion engine (as shown), electric motor, or other propulsion device, and a controller 16. Additionally, or alternatively, the vehicle 10 may include one or other components. The propulsion device 14 may be configured to at least partially power the vehicle 10. In some cases, the controller 16 may be in communication with the propulsion device and may control the propulsion device according to one or more parameters. In one example, the controller 16 may be configured to control the propulsion device based, at least in part, according to a target speed of the vehicle 10.

A target speed of the vehicle 10 may be selected in any manner. For example, a target speed of the vehicle 10 may be pre-set by a manufacturer or user, the target speed may be automatically set based on local speed limits, the target speed may be set by a user during operation of the vehicle, and/or the target speed may set in one or more other manners.

Figure 3:
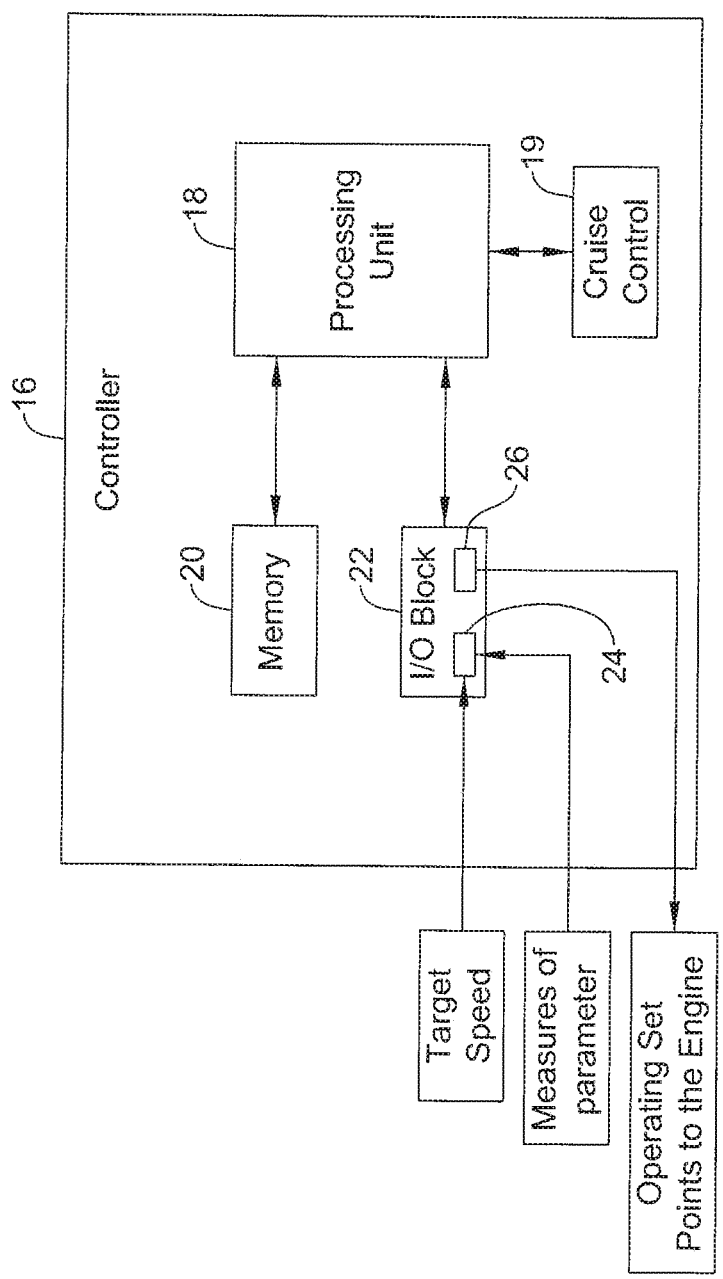
FIG. 3 is a schematic block diagram of a controller of the illustrative vehicle in FIG. 2.

The controller 16 of the vehicle 10 may include one or more components. As shown in FIG. 3, the controller 16 may include a processing unit 18, a cruise control module 19, memory 20 in communication with the processing unit 18, an input/output block 22 in communication with the processing unit 18, and/or one or more other components. In one example, the memory 20 may include one or more control system algorithms and/or other algorithms and the processing unit 18 may execute instructions (e.g., software code or other instructions) related to the algorithms in the memory 20.

The memory 20 may be local and/or remote memory. The memory 20 may be one or more portions of memory and/or may be any type of memory and/or may include any combination of types of memory. For example, the memory may be volatile memory, non-volatile memory, random access memory (RAM), FLASH, read-only memory (ROM), and/or one or more other types of memory.

The input/output block 22 may include one or more ports for communicating with components of the vehicle 10 and/or remote components (e.g., remote computing devices, global positioning systems, and so forth) In one example, the input/output block 22 may include an input port 24 for receiving a target speed, one or more measures of parameters, and/or other information, where the received target speed, one or more measures of parameters, and/or other information may be sent to the processing unit 18. In one example, the one or more measures of parameters may be related to a travel horizon of the vehicle or other features and may include one or more measures of a mass of the vehicle, a road grade of a road on which the vehicle is or is to be positioned over the travel horizon and/or one or more other measures of parameters. Further, the input/output block 22 may include an output port 26, where the output port 26 may be used by the controller 16 to provide one or more operating set points to the propulsion device and/or provide one or more other pieces of information. In one example, the operating set points of the propulsion device may be related to set points for actuators of a combustion engine or an electric motor. Actuators of a combustion engine may include one or more of a turbocharger waste gate (WG), variable geometry turbocharger (VGT), exhaust gas recirculation (EGR), start of injection (SOI), throttling valve (TV), and so on.

Figure 4:
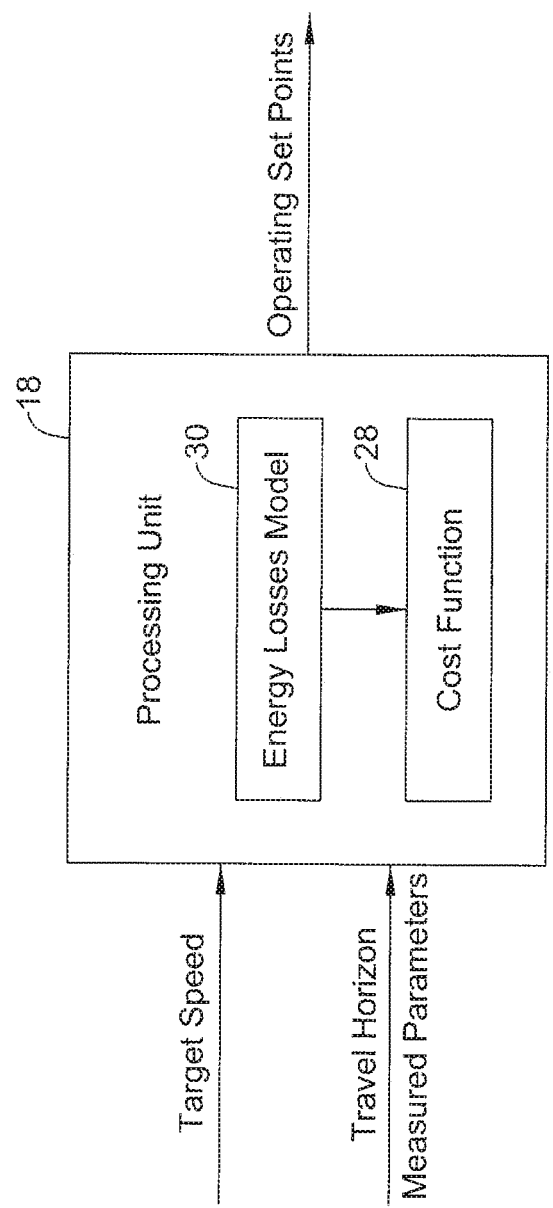
FIG. 4 is a schematic block diagram of illustrative inputs to and outputs from a processing unit of the illustrative controller of FIG. 3.

Turning to FIG. 4, the processing unit 18 is depicted with illustrative inputs and outputs, where the outputs may be based at least in part on the inputs. In some cases, the output of the processing unit may include operating set points for the propulsion device 14 based, at least in part, on received one or more measures of the parameters related to a travel horizon.

The processing unit 18 may include a vehicle operating model and a cost function 28. In one example, the vehicle operating model may be or may include a model of energy balances of the vehicle 10, such as an energy losses model 30 for the vehicle 10. The processing unit 18 of the controller 16 may optimize a cost function over a travel horizon, where the cost function is based at least in part on estimated energy losses according to the energy losses model 30 to set an actual speed for the vehicle.

The energy losses model 30 may estimate the energy losses over a travel horizon for a vehicle 10. In some cases, the energy losses model 30 may take into account losses of power and/or recoverable power. Example losses of power may include power loss due to aerodynamic drag for the vehicle 10, power loss due to friction of tires and powertrain (e.g., which may include engine friction), power loss due to conversion of primary energy into mechanical energy in the propulsion device (e.g. thermal losses of a combustion engine), and/or other power losses. Recoverable power may include power related to the grade-force and acceleration power.

Power losses due to aerodynamic drag and a quadratic term of friction may be represented by:

$$P_{l,1} = (\theta_1 \cdot v^2) \cdot v \quad (1)$$

where, $\theta_1$ is a constant proportional to a combination of a drag coefficient and a quadratic term of friction, and v is a velocity of the vehicle 10.

Power losses due to friction of tires on the vehicle 10 and a powertrain of the vehicle 10 may be represented by:

$$P_{l,2} = (\theta_2 \cdot v + \theta_3) \cdot v \quad (2)$$

where, $\theta_2$ is a constant proportional to a linear term of friction, $\theta_3$ is a constant proportional to a friction force and v is a velocity of the vehicle 10.

As mentioned above, the losses model 30 may take into account recoverable power of the vehicle 10, including but not limited to power related to the grade-force acting on vehicle 10 and acceleration power. Power related to the grade-force acting on a vehicle may be represented by:

$$P_g = m \cdot g \cdot \sin(\varphi) \cdot v \quad (3)$$

where, m is the mass of the vehicle and its contents, g is a gravitational acceleration constant (e.g., 9.81 meters per second squared), $\varphi$ is a grade angle of the route on which the vehicle is traveling, and v is the velocity of the vehicle 10. Power related to the grade-force acting on a vehicle may be accumulated as potential energy of the vehicle 10. The grade angle may be road grades of roads on which the vehicle 10 is to travel over the travel horizon and/or a current road grade of a road on which the vehicle 10 may be positioned. Further, the grade angle may be determined by sensors in the vehicle 10, a GPS in communication with the controller 16 of the vehicle 10, a maps program saved in the memory 20 of the controller 16, a remote maps program in communication with the controller 16, and/or in one or more other manners.

Acceleration power may be represented by:

$$P_a = m \cdot a \cdot v \quad (4)$$

where, m is the mass of the vehicle 10 and its contents, a is the acceleration of the vehicle 10, and v is the velocity of the vehicle 10. Acceleration power may be accumulated as kinetic energy of the vehicle 10.

Acceleration of the vehicle may be represented by:

$$a = \frac{1}{m} \cdot (f(u_e) - (\theta_1 \cdot v^2 + \theta_2 \cdot v + \theta_3 + m \cdot g \cdot \sin(\varphi))) \quad (5)$$

where, $f(u_e)$ is an algebraic function for the vehicle propulsion force depending on variable $u_e$, $u_e$ is a variable that could be one or more parameters of the propulsion device including brake torque, $T_{brake}$, m is the mass of the vehicle 10 and its contents, $\theta_1$ is a constant proportional to a combination of a drag coefficient and a quadratic term of friction, $\theta_2$ is a constant proportional to a linear term of friction, $\theta_3$ is a constant proportional to a friction force, g is a gravitational acceleration constant, $\varphi$ is a grade angle of the route on which the vehicle is traveling, and v is the velocity of the vehicle 10.

Velocity of the vehicle may be represented by:

$$v = v_0 + \int a \, dt \tag{6}$$

where, $v_0$ is an initial velocity of the vehicle 10, a is the acceleration of the vehicle 10.

Power losses due to conversion efficiency of the propulsion device may be represented by:

$$P_{l,e} = \frac{1 - \eta_e(n_e, u_e)}{\eta_e(n_e, u_e)} \cdot (P_{l,1} + P_{l,2} + P_g + P_a) \tag{7}$$

where, $\eta_e(\eta_e, u_e)$ is a conversion efficiency of the propulsion device 14 (e.g. the thermal efficiency of a combustion engine) of the vehicle 10 and may typically be a value between zero and one, $n_e$ is propulsion device speed, $u_e$ is a variable that could be one or more parameters of the propulsion device including brake torque, $T_{brake}$, and $P_{l,1}$, $P_{l,1}$, $P_g$, $P_a$ are power terms according to equations (1) to (4) above. In some cases, to determine power losses due to conversion efficiency of the propulsion device, only the difference between a physically maximum possible efficiency (e.g. the Carnot efficiency of a combustion engine) and an effective conversion efficiency may be considered.

Generally, distance-specific total primary-energy (e.g. fuel energy or electrical energy) over a travel horizon may be modeled by:

$$E_{tot} = \frac{1}{v_{mean} \cdot T} \int_0^T \frac{1}{\eta_e(n_e, u_e)} \cdot (P_{l,1} + P_{l,2} + P_g + P_a) dt \tag{8}$$

where, $v_{mean}$ is an average velocity of the vehicle over the travel horizon, T is a travel horizon of the vehicle 10, $\eta_e(n_e, u_e)$ is a conversion efficiency of the propulsion device 14 (e.g. a thermal efficiency of a combustion engine) of the vehicle 10, $n_e$ is propulsion device speed, $u_e$ is a variable that could be one or more parameters of the propulsion device including brake torque, $T_{brake}$.

The distance-specific total primary-energy (e.g. fuel energy) model of equation (8) has typically been used to model the energy consumed by a vehicle 10 over a travel horizon. However, herein a different proposed model may utilize distance specific total losses of energy of the vehicle 10 based on the energy losses referred to above and may be represented by:

$$E_{loss} = \tag{9}$$

$$\frac{1}{v_{mean} \cdot T} \int_0^T \left( \frac{1 - \eta_e(n_e, u_e)}{\eta_e(n_e, u_e)} \cdot (P_{l,1} + P_{l,2} + P_g \cdot P_a) + P_{l,1} + P_{l,2} \right) dt$$

where, $v_{mean}$ is an average velocity of the vehicle over the travel horizon, T is a travel horizon of the vehicle 10, the first summand in the integral represents power losses due to conversion efficiency of the propulsion device (see equation (7)), and $P_{l,1}$ and $P_{l,2}$ represent drag and friction losses of the vehicle according to equations (1) and (2), respectively.

The energy losses model may then be used in a cost function 28 to determine an optimum speed of the vehicle 10 over a travel horizon, which may be represented as follows as a sum over $N_{horz}$ incremental parts of the travel horizon:

$$J = \sum_{i=1}^{N_{horz}} c_E \cdot \left(\frac{E_i}{E_n}\right)^2 + c_v \cdot \left(\frac{v_i - v_{ref}}{v_n}\right)^2 \tag{10}$$

where, $c_E$ and $c_v$ are weights that typically may sum to one and are determined based on experimentation and/or user preferences, $E_i$ is the energy model of the vehicle over increment i of the travel horizon (e.g., either the energy losses model 30 using equation (9) or the energy losses model 30 using the distance-specific primary-energy model according to equation (8)), $E_n$ is an energy normalization factor that may be a function of target speed of the vehicle 10, $v_i$ is an average speed of the vehicle 10 over increment i of the travel horizon, $v_{ref}$ is a target speed of the vehicle, and $v_n$ is a speed normalization factor of the vehicle. The cost function 28 shown in equation (10) may be extended or expanded to include other terms based on user preferences. Such user preferences may include a desired maximum change in acceleration, a desired maximum acceleration, a desired time to travel a travel horizon, and/or one or more other desired factors.

Thus, based on using an energy losses model for a vehicle 10 traveling over a travel horizon one can obtain a more precise understanding of energy consumed by the vehicle 10 over the travel horizon. From this, the controller 16 of the vehicle 10 may be able to more precisely calculate an optimized speed for the vehicle to travel based on a target speed for the vehicle 10.

Figure 5:
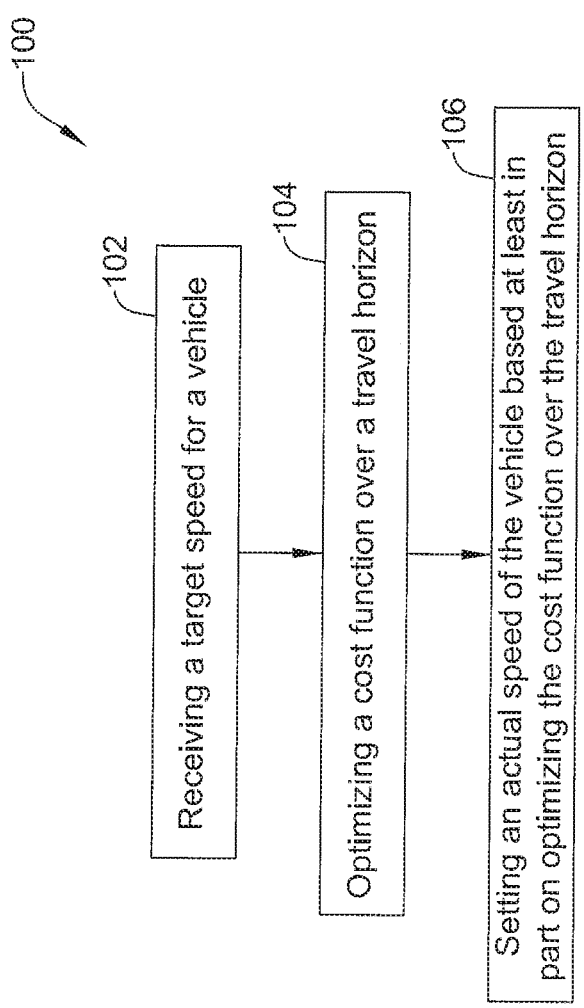
FIG. 5 is a schematic flow diagram of an illustrative approach for controlling a speed of a vehicle.

The optimization technique for a vehicle utilizing an energy losses model 30 of the vehicle 10 may be used in one or more approaches or methods, including a cruise control system approach. FIG. 5 depicts one example of using the above described energy losses model 30 in a process 100 for establishing an actual speed of a vehicle 10 from a user-specified target speed. The process 100 may include at step 102 receiving a target speed for a vehicle. In some cases, the target speed for the vehicle 10 may be received at the controller 16 in communication with the propulsion device 14 that may power the vehicle 10. At step 104, the process 100 may include optimizing a cost function 30 over a travel horizon of the vehicle 10. In some cases, the cost function 28 may be optimized over the travel horizon of the vehicle 10 based, at least in part, on energy losses of the vehicle over the travel horizon relative to the received target speed. For example, the controller 16 may use the cost function 28 utilizing a model as in equation (9) to determine and minimize the energy losses of the vehicle 10 over the travel horizon to determine an optimal speed of the vehicle 10 in view of the target speed. At step 106, an actual speed of the vehicle 10 may be set based, at least in part, on optimizing the cost function over the travel horizon.

The controller 16 of the vehicle 10 may optimize the cost function over the travel horizon. However, in some cases, one or more other controllers may optimize the cost function over the travel horizon and input the results of optimization to the controller 16 for determining propulsion-device set points (e.g. engine brake torque).

In some cases, the actual speed set may be the optimal speed of the vehicle identified by the cost function 28. Alternatively or in addition, the optimal speed may be presented to a user (e.g., driver) of the vehicle and the user may be given an option of setting the speed of the vehicle at the determined optimal speed or some other speed based on knowing the optimal speed for the user's requirements and the energy losses of the vehicle.

In some cases, the approach 100 may be used in a cruise control module 19 of the controller 16. The cruise control module 19 may control the propulsion device to establish a speed of the vehicle 10. In the cruise control module 19, the target speed may be a user specified cruise control speed and the set actual speed may be the established speed of the vehicle.

Figure 6:
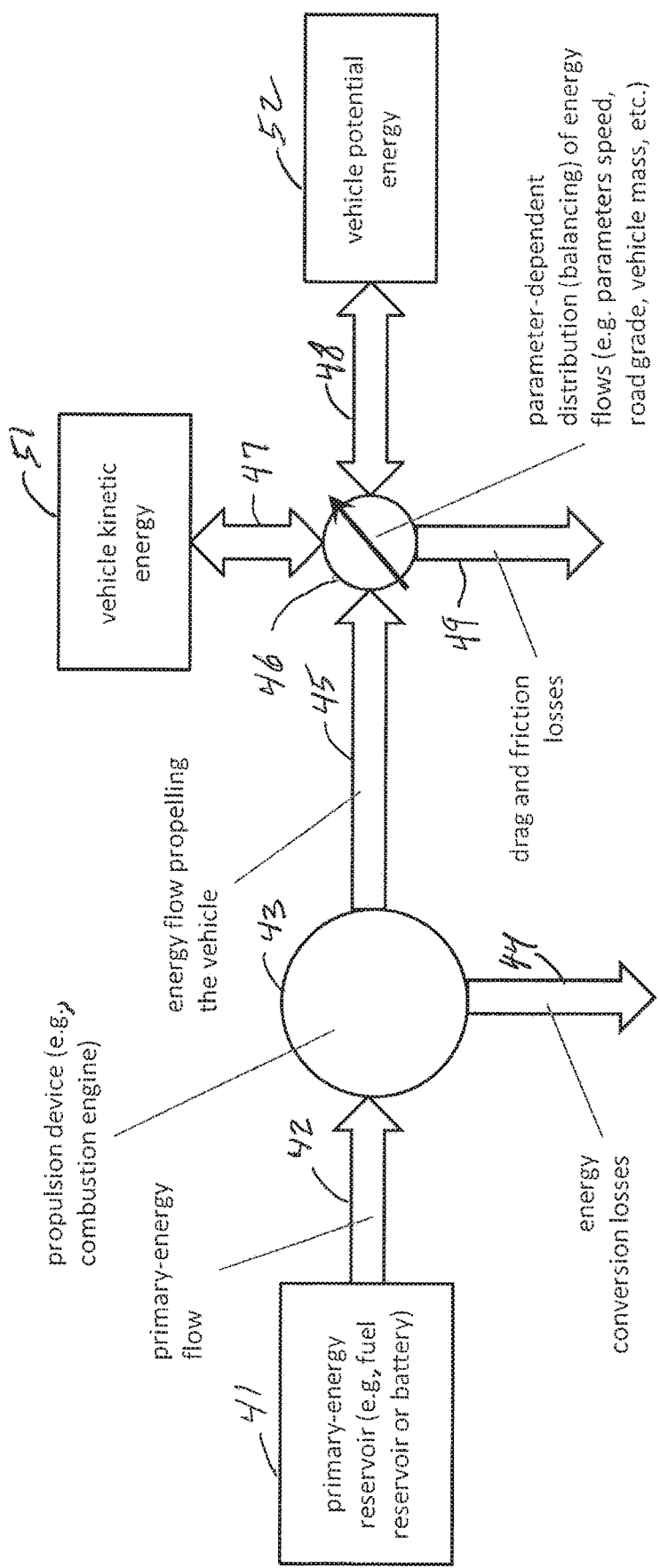
FIG. 6 is a diagram of energy flows that correspond to powers in equations.

FIG. 6 is a diagram of energy flows that correspond to the powers in equations. The power distribution "part" may balance the energy flows (powers) depending on physics and parameters such as vehicle mass, road grade, vehicle speed, such that the sum of all energy flows connected to the power distribution "part" is zero. Symbol 41 may resemble a primary energy reservoir (e.g., fuel reservoir or battery) having a primary-energy flow 42 to a propulsion device 43 (e.g., combustion engine). Energy conversion losses 44 may flow from device 43. An energy flow 45 propelling a vehicle may go to a symbol 46 indicating parameter dependent distribution (balancing) of energy flows (e.g., parameters of speed, road grade, vehicle mass, so forth. From symbol 46 is shown a flow 49 of drag and friction losses. There may be a two way flow 47 between symbol 46 and a vehicle kinetic energy block 51. Also, there may be a two way flow 48 between symbol 46 and a vehicle potential energy block 52.

The following is a recap of the above disclosure. A vehicle system may include a vehicle, a propulsion device such as a combustion engine, and a controller. The propulsion device may be configured to at least partially power the vehicle and the controller may be in communication with the propulsion device for controlling the propulsion device according to a target speed of the vehicle. The controller may include a model of energy balances of the vehicle and may be configured to use the model to estimate energy losses over a travel horizon of the vehicle. The controller may be configured to optimize in each processing step a cost function over the travel horizon of the vehicle based at least in part on the estimated energy losses to set an actual speed for the vehicle.

Further, the controller of the vehicle system may be configured to optimize the cost function at least in part by minimizing the energy losses relative to the target speed.

Further, the controller of the vehicle system may include a cruise control module and the target speed is a user specified cruise control speed.

The actual speed of the vehicle system as set by the controller may be the actual speed of the vehicle after a user has specified the user specified cruise control speed.

The travel horizon of the vehicle of the vehicle system may be a time interval.

The model of energy balances of the vehicle may include a parameter of road grades of roads on which the vehicle may travel over the travel horizon.

The model of energy balances of the vehicle system may include a parameter of a current road grade on which the vehicle is positioned.

The model of energy balances of the vehicle of the vehicle system may include a mass of the vehicle as a parameter.

The estimated energy losses of the vehicle system over the travel horizon may include energy loss due to aerodynamic drag of the vehicle.

The estimated energy losses of the vehicle system over the travel horizon may include energy loss due to friction.

The estimated energy losses of the vehicle over the travel horizon may include energy loss due to energy-conversion loss propulsion device (e.g., thermal loss from the engine) of the vehicle.

An approach for establishing an actual speed of a vehicle from a user-specified target speed may include receiving a target speed for a vehicle. The target speed is received at a controller in communication with a propulsion device configured to at least partially power the vehicle, optimizing a cost function over a travel horizon based at least in part on energy losses of the vehicle over the travel horizon relative to the target speed, and setting an actual speed of the vehicle based at least in part on optimizing the cost function over the travel horizon.

Further, the controller in the approach may include a model of vehicle energy balances to calculate the energy losses of the vehicle over the travel horizon.

Further, the approach may include optimizing a cost function over a travel horizon based at least in part on energy losses of the vehicle over a travel horizon based, at least in part, on minimizing energy losses of the vehicle over the travel horizon relative to target speed to establish an optimal speed.

The approach may further include obtaining one or more measures of parameters related to the travel horizon, wherein optimizing the cost function may take into account the obtained one or more measures of parameters related to the travel horizon.

Further, the controller in the approach may include a cruise control module configured to control the propulsion device to establish a speed of the vehicle and the target speed may be a user specified cruise control speed and the set actual speed may be the established speed of the vehicle.

A controller may be provided for a vehicle powered by a propulsion device. The controller may include a processing unit, an input for receiving one or more measures of parameters at the processing unit, and an output for providing one or more operating set points to the propulsion device based at least in part on the received one or more measures of parameters. The processing unit may receive a target speed for the vehicle over a travel horizon, may obtain one or more measures of parameters related to a travel horizon, and may optimize a cost function of the vehicle to provide operating set points for the propulsion device by minimizing energy losses of the vehicle relative to the received target speed and one or more obtained measures of parameters related to the travel horizon.

The provided operating conditions determined by the controller may establish an actual speed of the vehicle.

The energy losses minimized may include one or more of energy loss due to aerodynamic drag, friction present in the propulsion device, the powertrain, and in the tires, and a conversion loss from the propulsion device (e.g., thermal loss from the combustion engine).

The obtained measures of parameters related to a travel horizon may include one or more of a mass of the vehicle and a road grade of a road on which the vehicle is positioned over a travel horizon.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A process for establishing an optimal speed of a vehicle from a user-specified target speed, the process comprising:

receiving a target speed for a vehicle, where the target speed is received at a controller in communication with a propulsion device configured to at least partially power the vehicle;

optimizing, by the controller, a cost function over a travel horizon based at least in part on energy losses of the vehicle over the travel horizon by minimizing energy losses of the vehicle over the travel horizon to establish the optimal speed for the vehicle; and controlling, by the controller, the propulsion device to cause the vehicle to travel at the optimal speed by providing one or more operating set points for operation of the propulsion device.

2. The process of claim 1, wherein the controller includes a model of vehicle energy balances to calculate the energy losses of the vehicle over the travel horizon.

3. The process of claim 1, further comprising:

obtaining one or more measures of parameters related to the travel horizon; and wherein optimizing the cost function takes into account the obtained one or more measures of parameters related to the travel horizon.

4. The process of claim 1, wherein:

the controller includes a cruise control module configured to control the propulsion device to establish a speed of the vehicle;

the target speed is a user specified cruise control speed; and providing the one or more operating set points for operation of the propulsion device includes setting the cruise control module to establish the speed of the vehicle as the optimal speed.

5. The process of claim 1, wherein the propulsion device is a combustion engine, and the one or more operating set points include operating an actuator of turbocharger waste gate, a variable geometry turbocharger, an exhaust gas recirculation valve, start of injection, or a throttling valve.

6. The process of claim 1, wherein the one or more operating set points is engine brake torque.

7. A controller for a vehicle powered by a propulsion device, the controller comprising:

a processing unit;

an input for receiving one or more measures of parameters at the processing unit; and an output for providing one or more operating set points to the propulsion device based at least in part on the received one or more measures of parameters;

and wherein the processing unit is configured to:

receive a target speed for the vehicle over a travel horizon;

obtain one or more measures of parameters related to the travel horizon;

optimize a cost function of the vehicle to provide one or more operating set points for the propulsion device that cause the vehicle to travel at an actual speed by minimizing energy losses of the vehicle in view of the received target speed and one or more obtained measures of parameters related to the travel horizon; and control the propulsion device according to the one or more operating set points to cause the vehicle to travel at the actual speed.

8. The controller of claim 7, wherein the provided operating conditions are configured to establish an actual speed of the vehicle.

9. The controller of claim 7, wherein the propulsion device is an engine and the energy losses include one or more of energy loss due to aerodynamic drag, vehicle friction, and thermal loss from the engine.

10. The controller of claim 7, wherein the obtained one or more measures of parameters related to the travel horizon include one or more of a mass of the vehicle and a road grade of a road on which the vehicle is positioned over the travel horizon.

11. The controller of claim 7, wherein the propulsion device is a combustion engine, and the one or more operating set points include operating an actuator of turbocharger waste gate, a variable geometry turbocharger, an exhaust gas recirculation valve, start of injection, or a throttling valve.

12. The controller of claim 7, wherein the one or more operating set points is engine brake torque.

13. The controller of claim 7, further comprising a cruise control module configured to control the propulsion device to establish a speed of the vehicle; wherein:

the target speed is a user specified speed; and providing the one or more operating set points for operation of the propulsion device includes setting the cruise control module to establish the speed of the vehicle as the actual speed.

14. The controller of claim 7 wherein the one or more operating set points establish the actual speed for the vehicle.

* * * * *